United States Patent
Soffer

(10) Patent No.: US 10,585,731 B2
(45) Date of Patent: Mar. 10, 2020

(54) KVM HAVING BLUE SCREEN OF DEATH DETECTION AND WARNING FUNCTIONS

(71) Applicant: High Sec Labs Ltd., Caesarea (IL)

(72) Inventor: Aviv Soffer, Geva Carmel (IL)

(73) Assignee: HIGH SEC LABS LTD., Yokneam Industrial Zone (IL)

( * ) Notice: Subject to any disclaimer, the term of this patent is extended or adjusted under 35 U.S.C. 154(b) by 173 days.

(21) Appl. No.: 15/487,716

(22) Filed: Apr. 14, 2017

(65) Prior Publication Data

US 2017/0300371 A1   Oct. 19, 2017

Related U.S. Application Data

(60) Provisional application No. 62/322,284, filed on Apr. 14, 2016.

(51) Int. Cl.
| | | |
|---|---|---|
| *G06F 11/07* | (2006.01) |
| *G06F 11/30* | (2006.01) |
| *G06F 21/50* | (2013.01) |
| *G06F 3/14* | (2006.01) |
| *G06F 3/02* | (2006.01) |
| *G06F 3/023* | (2006.01) |
| *G06F 11/34* | (2006.01) |

(52) U.S. Cl.
CPC .......... *G06F 11/0709* (2013.01); *G06F 3/023* (2013.01); *G06F 3/0227* (2013.01); *G06F 3/1454* (2013.01); *G06F 11/0751* (2013.01); *G06F 11/0766* (2013.01); *G06F 11/3055* (2013.01); *G06F 11/3072* (2013.01); *G06F 21/50* (2013.01); *G06F 11/0793* (2013.01); *G06F 11/3476* (2013.01); *G06F 2201/815* (2013.01); *G06F 2201/86* (2013.01)

(58) Field of Classification Search
CPC .... G06F 11/34; G06F 11/162; G06F 11/0709; G06F 11/0793; G06F 11/1441; H04L 41/00; H04L 41/22; H04L 41/28
USPC ..... 709/223, 224, 229, 231; 710/19, 73, 311
See application file for complete search history.

(56) References Cited

U.S. PATENT DOCUMENTS

| | | | |
|---|---|---|---|
| 5,649,021 A * | 7/1997 | Matey | G06K 9/46 348/65 |
| 7,873,498 B2 | 1/2011 | Chien et al. | |
| 8,706,930 B2 * | 4/2014 | Fujita | H04L 65/602 710/62 |
| 8,769,172 B2 | 7/2014 | Soffer et al. | |
| 8,943,373 B1 * | 1/2015 | Angaluri | G06F 11/162 710/15 |

(Continued)

FOREIGN PATENT DOCUMENTS

| | | |
|---|---|---|
| CA | 2659480 A1 | 9/2010 |
| CN | 103049343 A | 4/2013 |
| CN | 104699615 A | 6/2015 |

*Primary Examiner* — James N Fiorillo
(74) *Attorney, Agent, or Firm* — Browdy and Neimark, PLLC

(57) ABSTRACT

A device, apparatus, system and method for determining failure of a computer host among a plurality of hosts. The host failure detection device may be integrated in a KVM apparatus. The device monitors the video output of the plurality of hosts and if identifies a Blue Screen of Death or BIOS failure Black Screen, it issues a warning and logs the details of the discovered failure. The device may attempt to recover the failed host by transmitting emulated keyboard and mouse commands to the failed host.

20 Claims, 14 Drawing Sheets

(56) References Cited

U.S. PATENT DOCUMENTS

| | | | |
|---|---|---|---|
| 2002/0091850 A1* | 7/2002 | Perholtz | H04M 11/045 709/231 |
| 2005/0022061 A1* | 1/2005 | Ozasa | H04N 5/775 714/37 |
| 2005/0076102 A1* | 4/2005 | Chen | H04L 41/0677 709/220 |
| 2005/0198245 A1* | 9/2005 | Burgess | G06F 3/14 709/223 |
| 2005/0246433 A1 | 11/2005 | Carrigan et al. | |
| 2006/0031447 A1* | 2/2006 | Holt | H04L 41/00 709/223 |
| 2008/0040522 A1* | 2/2008 | Matthews | G06F 3/023 710/107 |
| 2008/0052442 A1* | 2/2008 | Matthews | H04L 43/0817 710/311 |
| 2009/0150580 A1* | 6/2009 | Wen | G06F 3/023 710/72 |
| 2009/0304275 A1* | 12/2009 | Kodavalla | G06T 5/009 382/167 |
| 2010/0005331 A1* | 1/2010 | Somasundaram | G06F 1/28 713/340 |
| 2010/0064079 A1* | 3/2010 | Harvey | G06F 3/0227 710/73 |
| 2010/0100652 A1 | 4/2010 | Lin et al. | |
| 2011/0208963 A1 | 8/2011 | Soffer | |
| 2011/0252153 A1* | 10/2011 | Vlodavsky | G06F 21/305 709/229 |
| 2012/0154375 A1* | 6/2012 | Zhang | G06F 9/4411 345/419 |
| 2013/0050084 A1 | 2/2013 | Soffer | |
| 2013/0054794 A1* | 2/2013 | Liu | G06F 3/1438 709/224 |
| 2014/0267908 A1* | 9/2014 | Hagenbuch | G09G 5/14 348/552 |
| 2014/0337558 A1* | 11/2014 | Powers | G06F 13/4072 710/313 |
| 2015/0009222 A1* | 1/2015 | Diard | G06F 9/45533 345/505 |
| 2015/0261598 A1* | 9/2015 | Balasubramanian | G06F 11/0793 714/10 |
| 2015/0378851 A1* | 12/2015 | Kobayasi | G06F 11/1441 714/4.1 |
| 2016/0077842 A1* | 3/2016 | Turnock | G06F 13/10 710/10 |
| 2016/0227149 A1* | 8/2016 | Dickens | G11B 27/00 |
| 2016/0241829 A1* | 8/2016 | Qu | G09G 5/006 |
| 2016/0371149 A1* | 12/2016 | Antony | G06F 11/1441 |

\* cited by examiner

Figure 1A (ART)

Figure 1B (Prior Art)

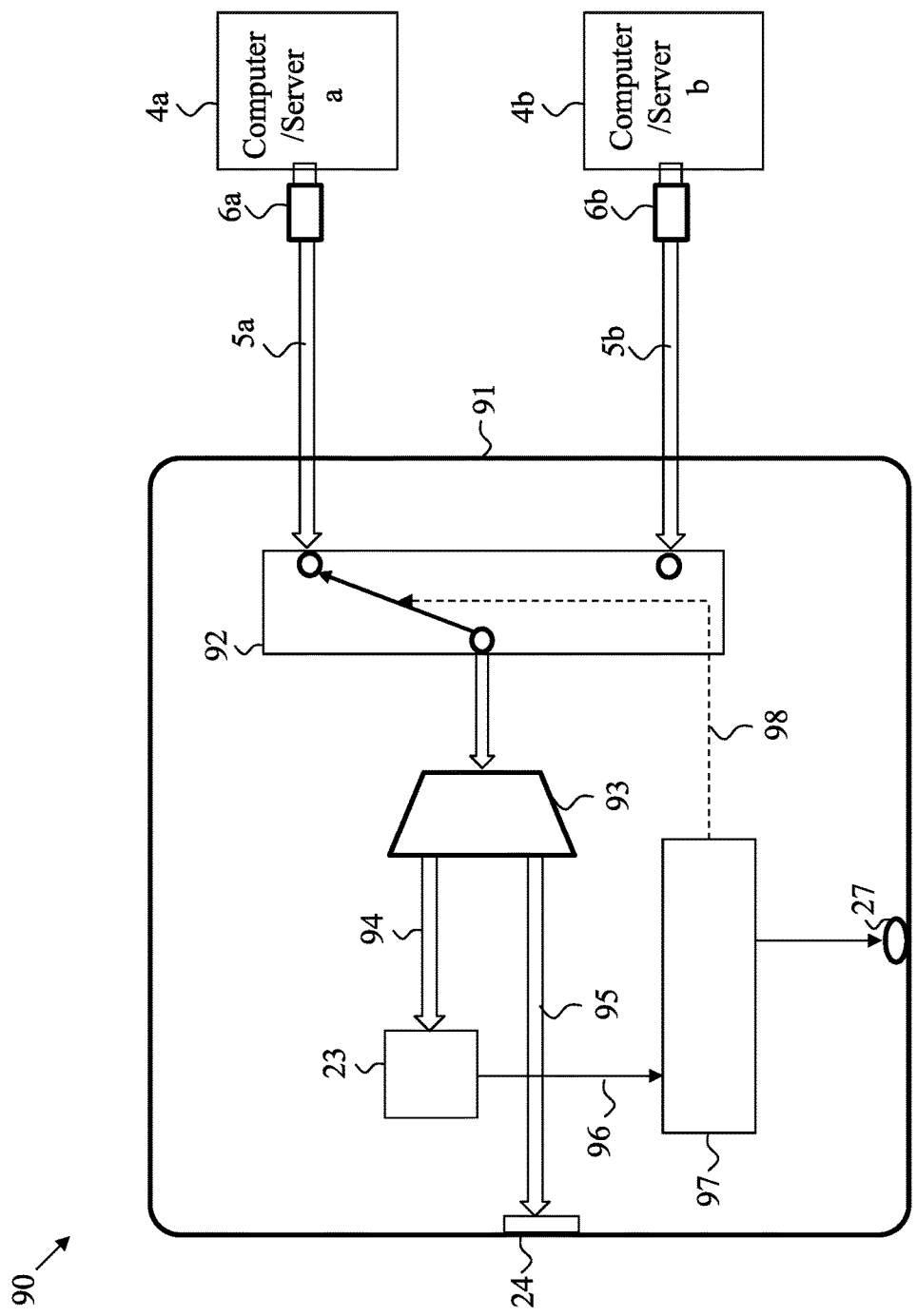

KVM HAVING BLUE SCREEN OF DEATH DETECTION AND WARNING FUNCTIONS

FIELD OF THE INVENTION

The present invention relates to a device and a method that enables a KVM (Keyboard Video Mouse) switch to detect Blue Screen of Death or similar catastrophic computer failure screens automatically, and generate an automatic warning message to the system administrator once such event is being detected.

BACKGROUND OF THE INVENTION

KVM switches are being used to monitor and enable centralized access to multiple servers or computers from a single set of console peripheral devices (keyboard, mouse and display). KVM switches are using by system administrators to monitor and handle computer and server catastrophic failures.

One of the most critical computer or server failure events is the "Blue Screen of Death" (BSoD). The BSoD is an error screen displayed on a Windows computer system after a fatal system error, also known as a system crash, when the operating system reaches a condition where it can no longer operate safely.

Similar critical failure may occur if the computer or server is booting and fails to pass the BIOS stage. In this case known as "black screen" (Bios Black Screen "BBS"), typically an administrator manual intervention is needed in order to recover from the failure as additional reset command may cause loop back to the same situation.

In most cases the administrator will be warned by the user once critical failure occurs. Then, the administrator will access the local or remote KVM console to search for the faulty computer or server by switching to the proper channel.

Simple Network Management Protocol (SNMP) is a protocol-based network management system. It is used to manage TCP/IP-based and IPX-based networks. Information on SNMP can be found in the Internet Request for Comment (RFC) 1157. Microsoft provides an SNMP agent, or client, for Windows NT and Windows 95. Microsoft, however, does not offer any management capabilities. There are third-party companies that offer products specifically designed for SNMP management. SNMP provides the ability to send traps, or notifications, to advise an administrator when one or more conditions have been met. Traps are network packets that contain data relating to a component of the system sending the trap. The data may be statistical in nature or even status related. SNMP traps are alerts generated by agents on a managed device.

Chinese patent application CN 104699615A titled "System failure processing method and device", discloses a system failure processing method. The method includes: monitoring whether or not a system running in a virtual machine has a blue screen; if yes, ending a virtual machine thread through an external program; configuring the virtual machine through a preset program to start the system from an external storage device; automatically searching for a memory dump file of system blue screen; after finding the memory dump file, backing up the memory dump file to a specified address.

Chinese patent application CN 103049343 A titled: "Method and device for restoring operating system blue screen", discloses a method comprises the steps of identifying whether bugs recorded in files for restoring system bugs are core files or not and need backup or not through specific fields when the files for restoring system bugs are detected; performing backup of the core files replacing restored files before the bugs needing back up are restored; using the backup core files to cover the restored files causing the blue screen when the restored bugs cause the operating system blue screen.

U.S. Pat. No. 7,873,498 B2 titled: "Remote hardware inspection system and method", discloses a remote hardware inspection system, including a remote monitor station and a client server. The monitor station includes a hardware inspection unit and a first network interface. The hardware inspection unit is for generating a hardware inspection command which is transmitted to the server by the first network interface. The server includes a second network interface, an input/output unit, and a managing/controlling unit. The input/output unit has an inspection program. The second network interface receives the hardware inspection command and transmits it to the managing/controlling unit. In response to the hardware inspection command, the managing/controlling unit generates and transmits a trigger signal to the input/output unit to implement the inspection program. Thereby, the inspection program writes data into the target hardware of the server according to the content of the hardware inspection command.

U.S. Pat. No. 8,769,172; titled "Secure KVM device ensuring isolation of host computers"; to Aviv Soffer; discloses apparatuses and systems for operating multiple computers from a single console using a secured KVM device, while preventing information leakage between the computers. The system comprises several hosts connected through a secured KVM device to keyboard and mouse and one or more user displays. Secured KVM enables standard bi-directional communication between Secured KVM and user keyboard and mouse and between hosts peripheral ports and Secured KVM. Secured KVM physically enforces unidirectional data flow from attached keyboard and mouse to attached hosts peripheral ports to avoid potential leakages between hosts.

US20110208963; titled: "Secured kvm system having remote controller-indicator" to Aviv Soffer; discloses a KVM switch capable of providing secure remote extension of KVM control and indication functions.

US20130050084; titled "secure KVM system having multiple emulated EDID functions"; to Soffer Aviv; discloses a KVM (Keyboard Video Mouse) device for operation in high security environments. More specifically, this secure KVM allows flexibility of operation of modern displays while maintaining isolation among the connected hosts.

SUMMARY OF THE EMBODIMENTS

The current invention is generally related to a device, method and system that allow automatic detection of failure or "crash" of a host computer or a server or few host computers or servers from a plurality of such host computers or servers (termed "hosts" from now on) connected to the fault detection unit. In response to detection of a failure event, the fault detection unit issues a warning signal or a message to the user and/or to computer system administrator. Additionally and optionally, fault detection unit may initiate automatic failure recovery actions. The fault detection unit receives video signals from the plurality of the host and analyze the video signals to determine if, and which host had crashed. The fault detection unit may be used in one of the following ways: 1) As a stand-alone device; 2) Integrated into a KVM switch; and 3) Integrated into other computer networking devices.

As a stand-alone, the fault detection unit, the unit is connected to the video outputs of each of the plurality of monitored hosts to receive video signals. The unit is connected to at least one management device and reports to the management device when a fault event is detected. Optionally, the fault detection unit is connected to the monitored hosts via command channel such as USB channel and is capable to transmit recovery commands to reset, reboot or otherwise attempt to correct or overcome the detected fault. The fault detection unit may probe each of the video signals sequentially. This can be done by using a multiplexor to connect one video signal at a time to a fault detection circuitry. Alternatively, the fault detection circuitry may monitor few or all the video signals in parallel.

The fault detection unit may be integrated into a video switching KVM switch. Video switching KVM switches are known in the art. Thus, in description and drawings some details of the known KVM functionalities may be missing or only briefly explained. In a video switching KVM switch, the user views video from one selected host and interacts with that selected host via a keyboard and mouse. It is the aim of the exemplary embodiment to monitor the non-selected hosts (and optionally also the selected host) for faults. This can be done for example by connecting all the video signals to a fault detection unit integrated into the video switching KVM switch device. Fault alerts van be displayed on the user monitor or using a separate display. A KVM switch is already connected to each of the host via a keyboard and mouse channels (these channels may be united to a single human interface channel such as a composite USB channel). This channel(s) may be used by the user to attempt to recover the crashed host from the fault. Additionally, optionally, or alternatively, this channel(s) may be used to automatically attempt to recover the affected host from the fault. Optionally, a separate command line, for example a second USB channel is used for the automatic recovery attempt. Optionally, the recovery may be achieved while the user continues to interact with another host or hosts that perform normally. Optionally, once a fault is detected, the KVM selects the affected host and lets the user attempt to recover it.

The fault detection unit may be integrated into a video processing (multi-viewer) KVM switch. Video processing KVM switches are known in the art and. In contrast to a video switching KVM, in a multi-viewer KVM a video processor receives video signals from all the connected host and generate a composite display including images from one or plurality of selected hosts and optionally a generated images that are generated by a video processor within the a multi-viewer KVM. In this exemplary embodiment, the fault detection circuitry is connected to or integrated into the video processor within the multi-viewer KVM.

The fault detection unit may be integrated into a KVM over IP switch. KVM over IP switches are known in the art. In such KVM switches, a remote user interacts with a plurality of hosts that are in a different location and are locally connected to the KVM over IP switch. A KVM over IP switch is similar in its construction and operation to one of the abovementioned KVM switches, but instead of having a local display and human interface devices, the display and human interface devices are at the remote location. The user (or administrator) may interact with a plurality of such KVM over IP switches, and optionally may only infrequently interact with a host, optionally only when the host needs special attention such as upgrading or in case it crushed. It is advantageous to provide a KVM over IP switch with fault detection and alerting capabilities such that the remote user does not have to monitor the health of the multitude of hosts that may be connected to a plurality of KVM over IP switches, but will be automatically informed when a fault occurs. It may be advantageous to further provide a KVM over IP switch with fault recovery and reporting capabilities such that the remote user does not have to monitor and maniacally perform a recovery of each faulty host, but will be automatically informed when a fault occurs and successfully recovered, and alerted when the recovery attempt had failed.

The fault detection unit may be integrated into a Local Rack Access (LRA) Console. LRA consoles are rack-mounted KVM and are known in the art. Such LRA consoles are often used in server farms where large number of hosts are used, thus the advantages of the invention are utilized.

The fault detection unit may be integrated into a secure KVM switch. In a secure KVM, absolute data and logic separation is maintained. This properly is of utmost importance for high security installations such as the police, banking, and other high security installations. Preferably, separation among the hosts is achieved using hardware device. When processors are used, it is important to protect the codes against hacking. Generally it may be assumed that any of the hosts may be hacked or infected with a computer virus. Additionally, even the user or the administrator may be suspected in some cases. Unidirectional data flow enforcing circuitries may be added to allow the fault detection circuitry to receive video signals from a plurality of hosts, analyze these signals, inform the user or administrator about the detected fault event, and optionally attempt to recover the affected host, all without compromising the isolation of the hosts.

To shorten the troubleshooting and handling of "Blue Screen" and/or "Black Screen" events, it is desirable to have an automatic detection system will be provided to detect such failure among multiple computers or servers.

In exemplary embodiments, it is further desirable that such detection would be integrated into the KVM to prevent the need to add multiple cabling to each computer or server.

In exemplary embodiments, it t would also be advantageous that this failure detection function would be able to send a warning message once a failure is being detected to the assigned system administrator.

In exemplary embodiments, it t would also be advantageous that this failure detection function would be able to automatically take action to recover from the failure once a failure is being detected.

Exemplary embodiments overcome the disadvantages of prior art by providing a way for the KVM to scan all connected computer video outputs to detect special failure screen such as:

1. Blue Screen of Death—detection of this event can be done by analyzing the incoming video input and finding the following unique statistical characteristics:
   a. Image is substantially static (no, or minimal changes from frame to frame). This allows early detection of BSoD. BSoD initially displays memory dump process. In this case the BSoD will change for the first 30 seconds or so to add more lines of memory dump. It may be possible not to wait for the image to become static and shorten the detection of BSoD. It may be enough to check that a preset percentage, for example 90% of the pixels are static after 1 second to conclude that the image is BSoD (together with the other criterions).]
  b. Large percentage of the display area is Navy Blue color (R=0, G=0, B=130 or HEX #000082).
  c. Other areas are white colored fonts (R=G=B).
2. Black Screen of BIOS (BBS)—detection of this event can be done by analyzing the incoming video input and finding the following unique statistical characteristics:
  a. Image is substantially static (minimal changes from frame to frame). Similarly to the above, the Black Screen of BIOS may also be a subject of early detection.
  b. Large percentage of the display area is black color (R=0, G=0, B=0 all <=30).
  c. Other areas are white colored fonts (R=G=B all >=30).

A table preconfigured inside the KVM device may assign administrator email and phone number for each or all KVM channels. In addition, SNMP trap may be set to enable detection by standard management tools. Once one of the failure screens above is being detected by the KVM, a special warning message is sent to the assigned administrator.

Such email message may include at least some the following information:
1. The site;
2. The time of failure;
3. The detected screen type;
4. The name of the server/its exact location in the rack;
5. The failure history of that computer/server (last similar events);
   When a catastrophic event occurs in a specific server or computer among large number of similar platforms, it is important to understand the potential cause of such event. The history of the specific server or computer may assist in the understanding of the exact cause. Such information may be difficult or even impossible to extract from a server or computer once it failed. In addition to that, similar platforms may experience similar failures in the past. Access to such information may improve the overall server or computer farm up-time and reliability. It should be noted that this statistical data may be collected by other management solutions but in many cases it is difficult to find at the time that the failure occurs.
6. Screen capture of the failure screen; and
7. Shortcut for remote management over IP of that computer/server.

KVM device may be configured to provide automatic remedy for the detected failure. For example—upon detection of the Blue Screen of Death, the device will use the emulated keyboard function to trigger a key sequence like CTRL+ALT+DEL. Such a sequence, if sent may be used for resetting or rebooting the host computer that generated the BSoD.

Upon detection of the BBS, the device may use the emulated keyboard function to trigger a F8 to command an automatic reboot.

Other command or a sequence of commands may be used as needed.

Additionally or alternatively, the device may use an emulated mouse function to send mouse commands such as clicking on icons or screen positions to case the computer to recover from its fault state. A combination of emulated mouse function and emulated keyboard function may be used.

It should be noted that in the drawings only two hosts are seen in order to reduce figure cluttering. However, generally, the number of hosts connected to a KVM switch or to a fault detection unit may be larger.

It is an aspect of the current invention to provide a KVM device for monitoring and operating plurality of coupled computers or servers comprising:
  a plurality of computer interfaces, each capable of receiving video signal from a host computer or server;
  a plurality of video receivers, each coupled to the corresponding one of said computer interfaces to convert video signals received from said computer video interface to common video format;
  a video processor, capable of receiving at least one video signal in common video format from said video receivers and transmit at least one combined or switched video output to at least one locally connected display;
wherein said video processor is further having a video analysis function to enable video statistical recognition of pre-defined failure screens selectable from the list of: Blue Screen of Death; Black Screen of Death; and other pre-defined failure screens captured by the manufacturer or by the administrator.

In some embodiments the video processor is further coupled to a video transmitter to convert video format received from the video processor it into a standard video display protocol to drive external display.

In some embodiments the computer interfaces are further comprising USB device emulators to enable emulation of USB devices selectable from the list of: USB keyboard; USB pointing device; USB audio device; USB floppy drive device; USB Mass storage device; and USB communication class device.

In some embodiments the KVM device further comprises a KVM over IP function to compress and send video output from said video processor to a remote administrator over IP.

In some embodiments the KVM device further comprises a Scaler function to scale video information to the format used by the connected display.

In some embodiments the video processor further comprising PiP functionality.

In some embodiments the KVM device further comprises an audible warning device for alerting when a host failure was detected.

In some embodiments the KVM device further comprises a warning function, capable of warning a system administrator through one of: email; system message sent to centralized management system; and SMS to the administrator mobile phone.

In some embodiments the warning the administrator is based on a table that predefines the assigned admin to each server.

In some embodiments the warning email includes video capture.

In some embodiments the KVM device is capable of generating and maintaining Log detain failure events.

In some embodiments the warning email includes log and history of the failed server.

In some embodiments the KVM device is configured to provide automatic remedy for the detected failure.

In some embodiments the automatic remedy for the detected failure comprises upon detection of the Blue Screen of Death, transmitting to the failed host emulated keyboard sequence comprising CTRL+ALT+DEL.

In some embodiments, the KVM behavior does not change once failure detected in a way that may be detectable to the other (non-failed) computers.

It is an aspect of the current invention to provide a method for detecting failure of a host comprising: identifying and counting pixels in a first color range in a video frame; identifying and counting pixels in a second color range in said video frame; counting the total number of pixels in said video frame; comparing the number of pixels in said first color range to said total number of pixel in said video frame; comparing the number of pixels in said second color range to said total number of pixel in said video frame; and determining if the host computer that generated said video frame based on said comparing the number of pixels in said first color range to said total number of pixel in said video frame and said comparing the number of pixels in said second color range to said total number of pixel in said video frame.

In some embodiments the method further comprises field updates to the failure of a host detection algorithm.

In some embodiments the field updates to the failure of a host detection algorithm enables detection of new types of failure screens.

In some embodiments the field updates to the failure of a host detection algorithm enables to skip and avoid false detection of other type of failure screens.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Unless marked as background or art, any information disclosed herein may be viewed as being part of the current invention or its embodiments.

BRIEF DESCRIPTION OF THE OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1A illustrates an example of Windows XP Blue Screen of Death as known in the prior art.

FIG. 1B illustrates an example of Windows Black Screen of Death as known in the prior art.

Figure 2A:
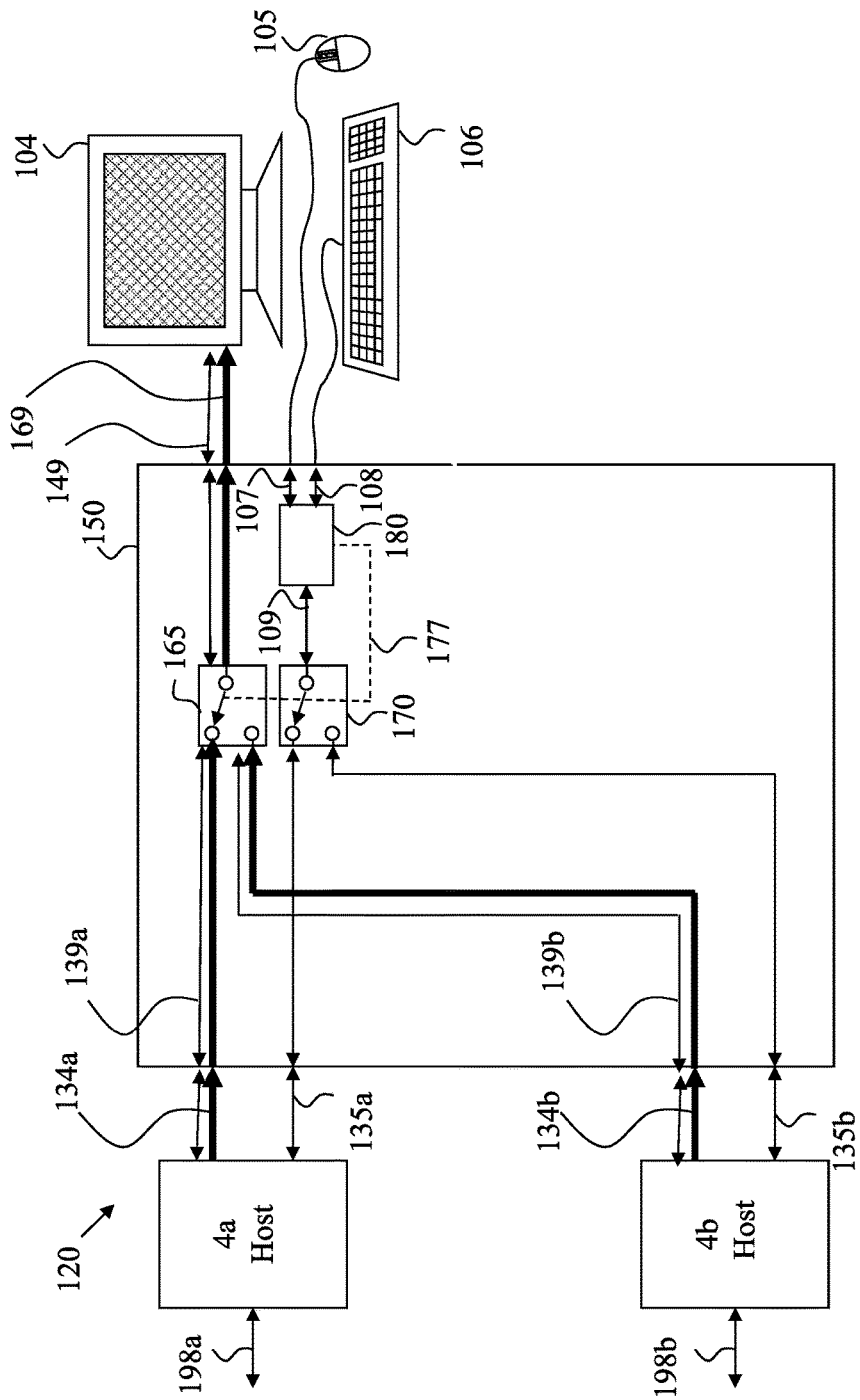

FIG. 2A schematically illustrates a KVM switching system of the prior art.

Figure 2B:
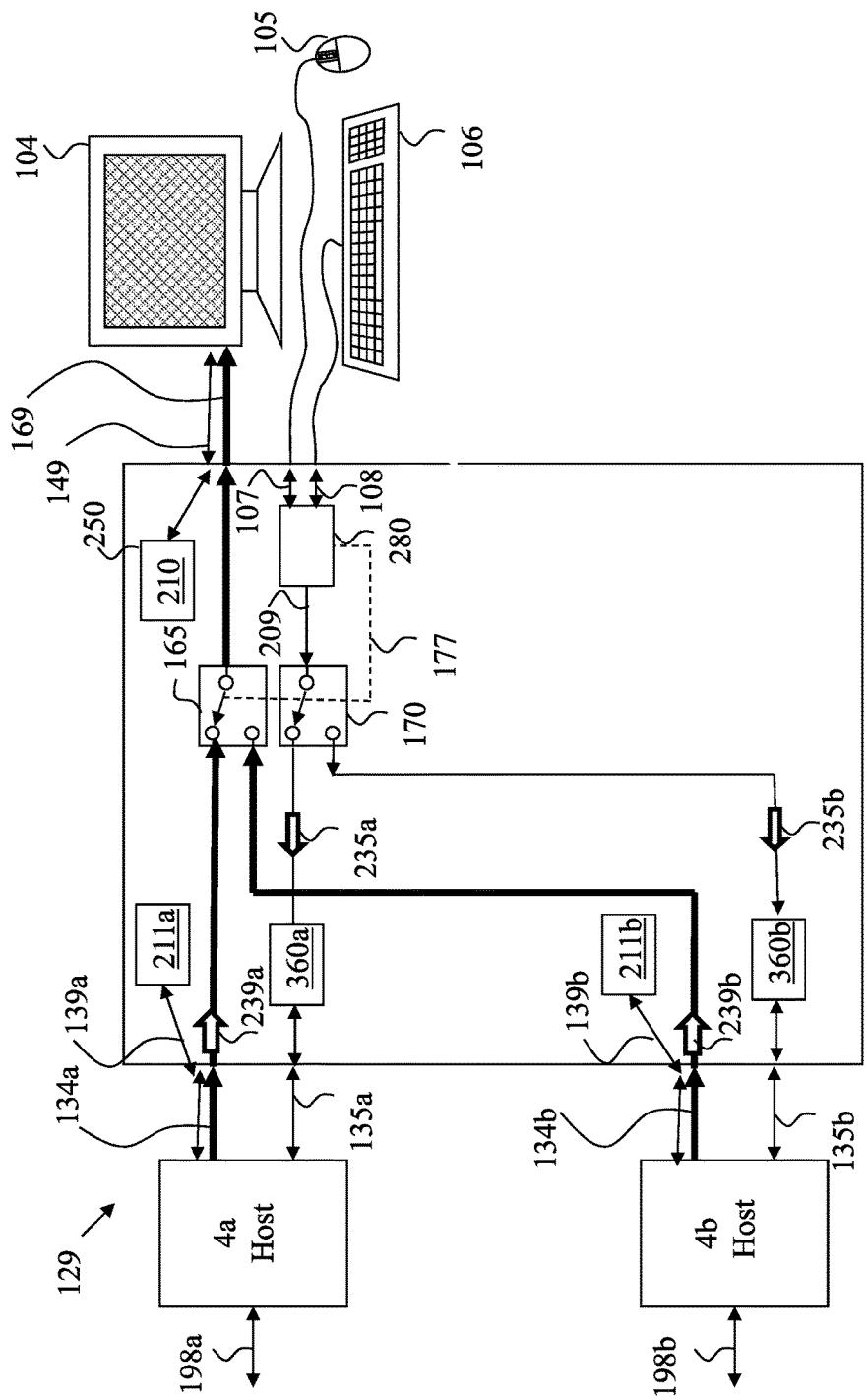

FIG. 2B schematically illustrates a secure KVM switching system of the prior art.

Figure 3A:
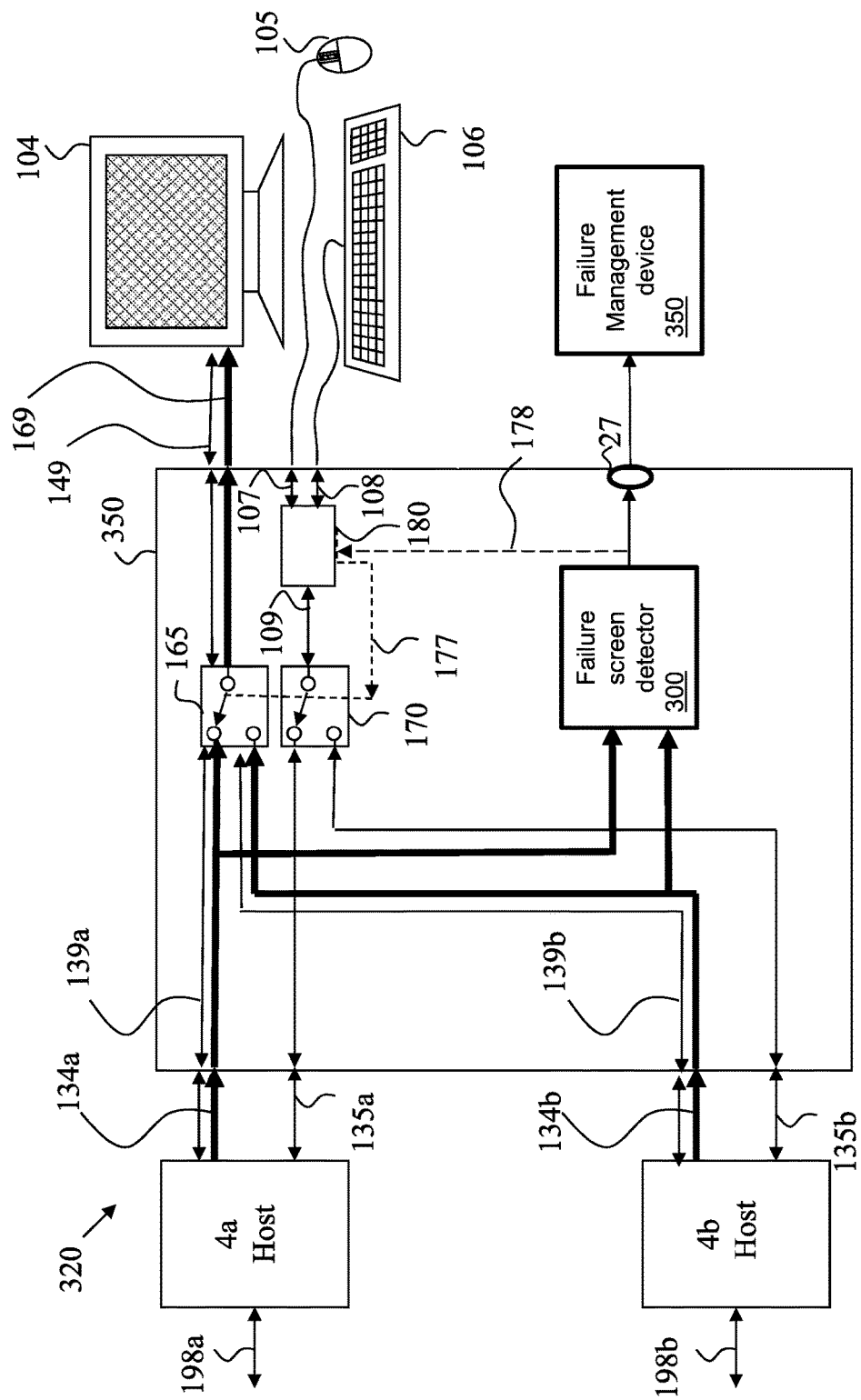

FIG. 3A schematically illustrates a computer system using a KVM switch with a fault detection unit according to an exemplary embodiment of the current invention.

Figure 3B:
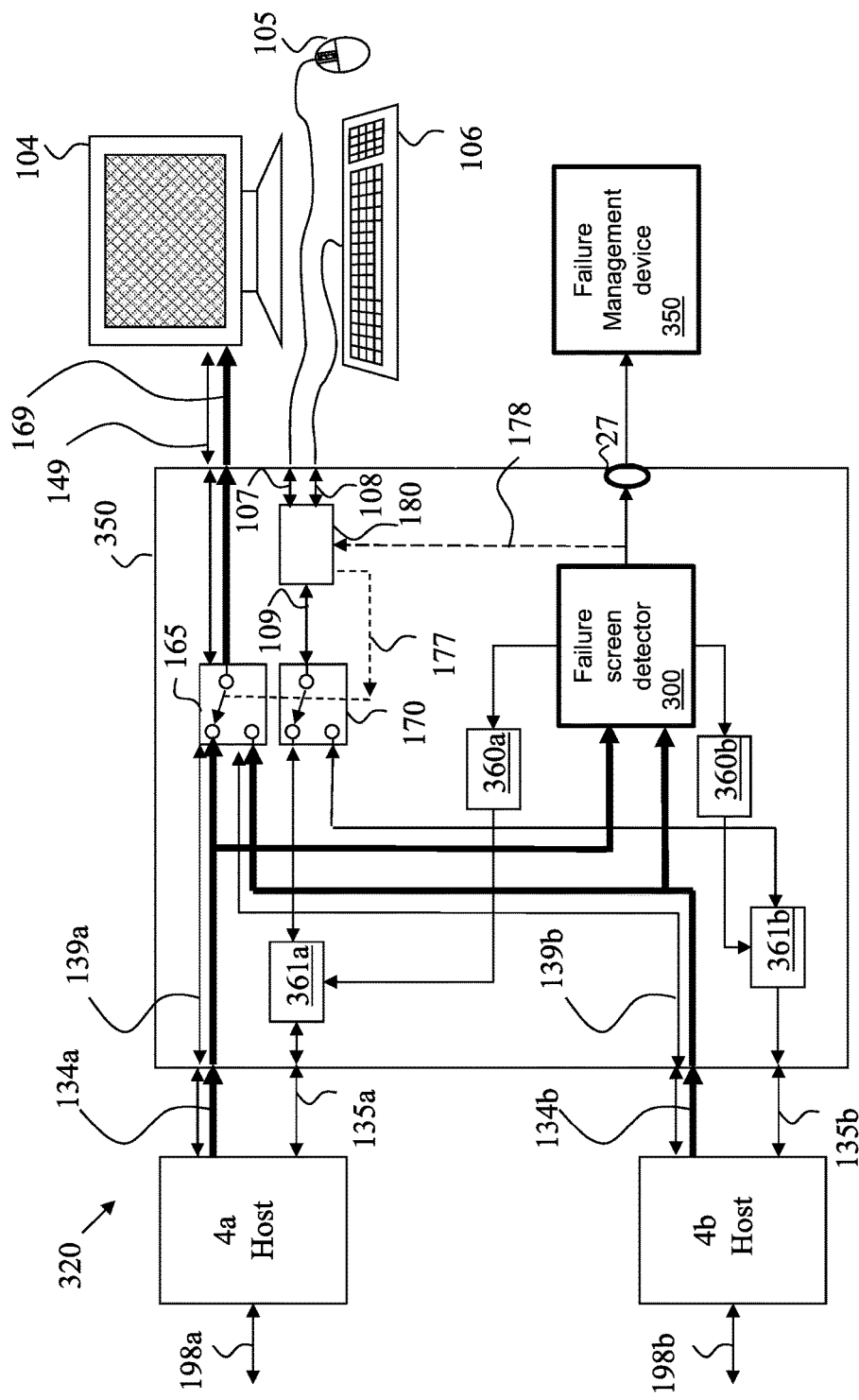

FIG. 3B schematically illustrates a computer system using a secure KVM switch with a fault detection unit according to another exemplary embodiment of the current invention.

Figure 3C:
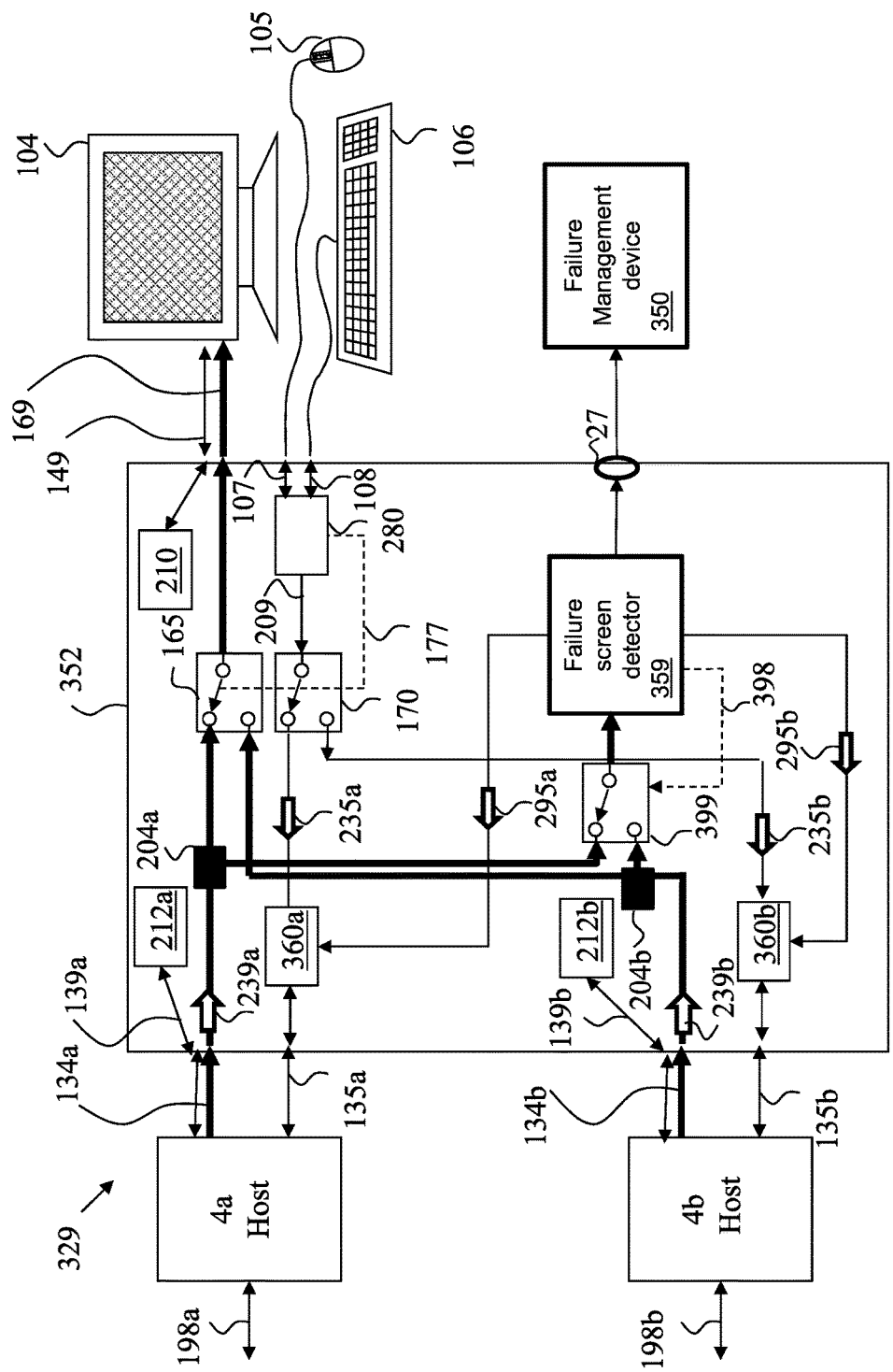

FIG. 3C schematically illustrates a computer system using a secure KVM switch with a fault detection unit according to an exemplary embodiment of the current invention.

Figure 3D:
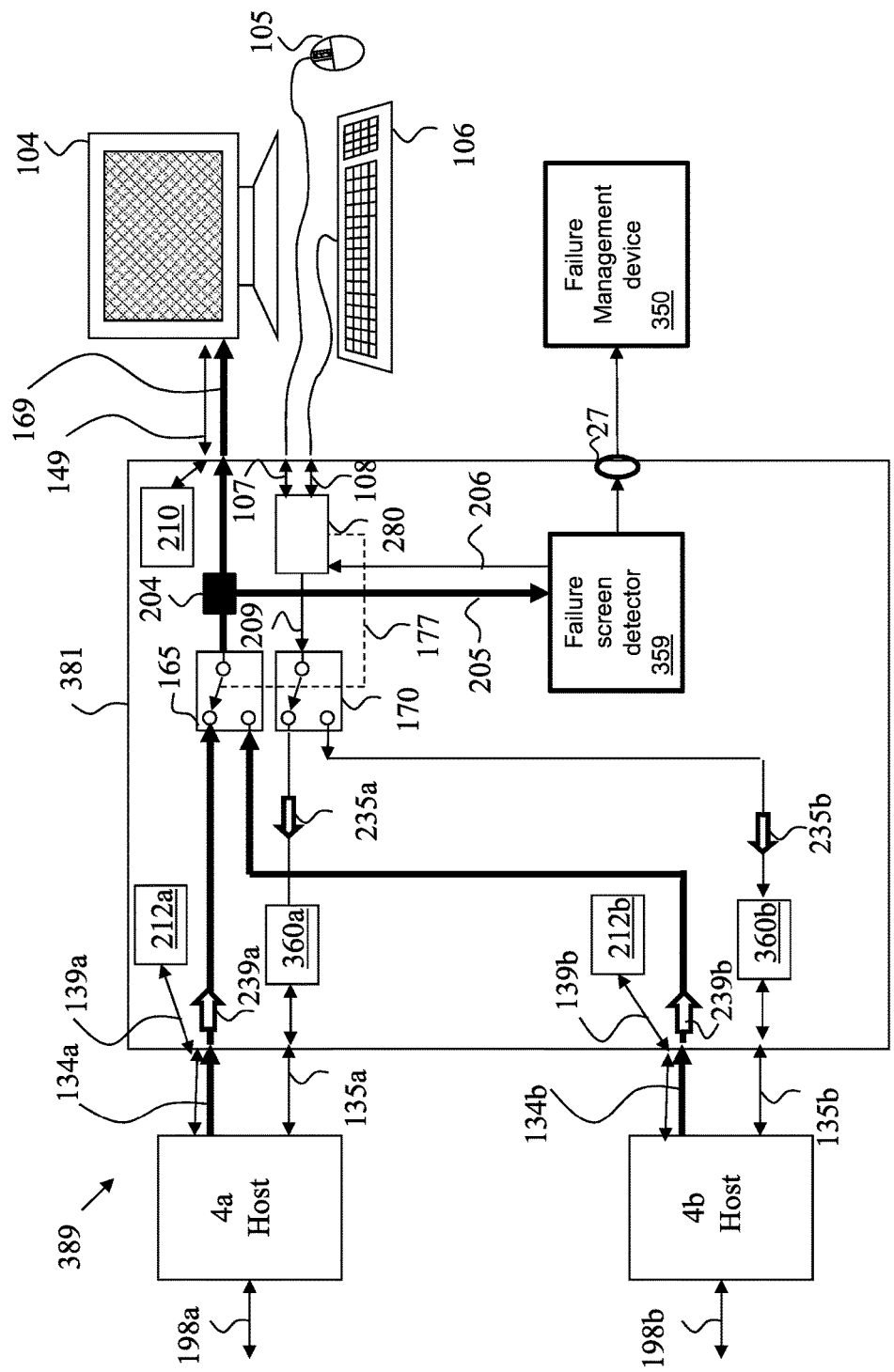

FIG. 3D schematically illustrates a secure computer system using a secure KVM switch with a fault detection unit according to another exemplary embodiment of the current invention.

Figure 4A:
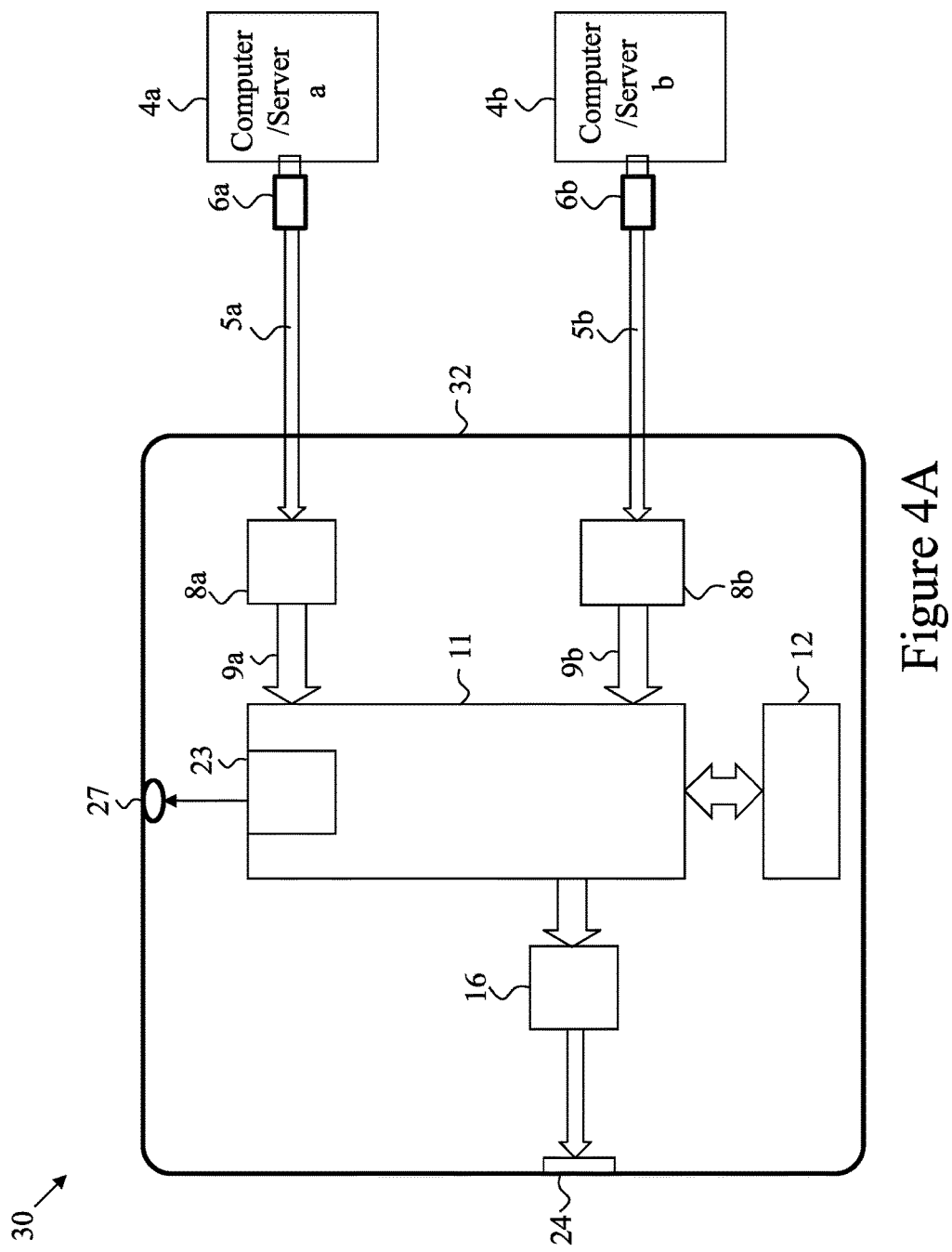

FIG. 4A illustrates a high-level block-diagram of an exemplary embodiment of the present invention having a video processor and local display.

Figure 4B:
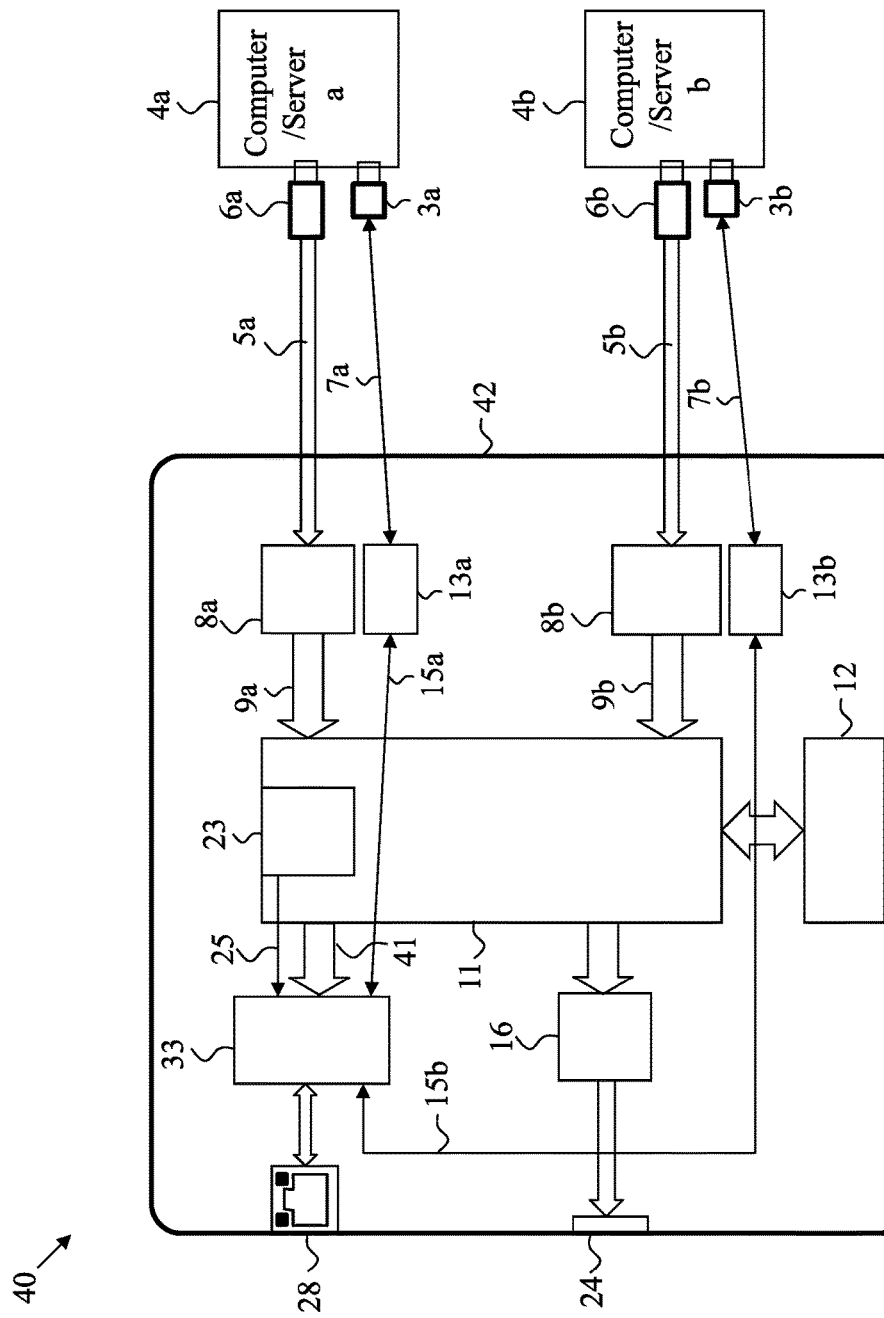

FIG. 4B illustrates a high-level block-diagram of yet another high-level block-diagram of another exemplary embodiment of the present invention having a video processor and a remote display, keyboard and mouse over IP.

FIG. 4C illustrates a high-level block diagram of a KVM system according to another exemplary embodiment of the current invention having a switching video function.

Figure 4D:
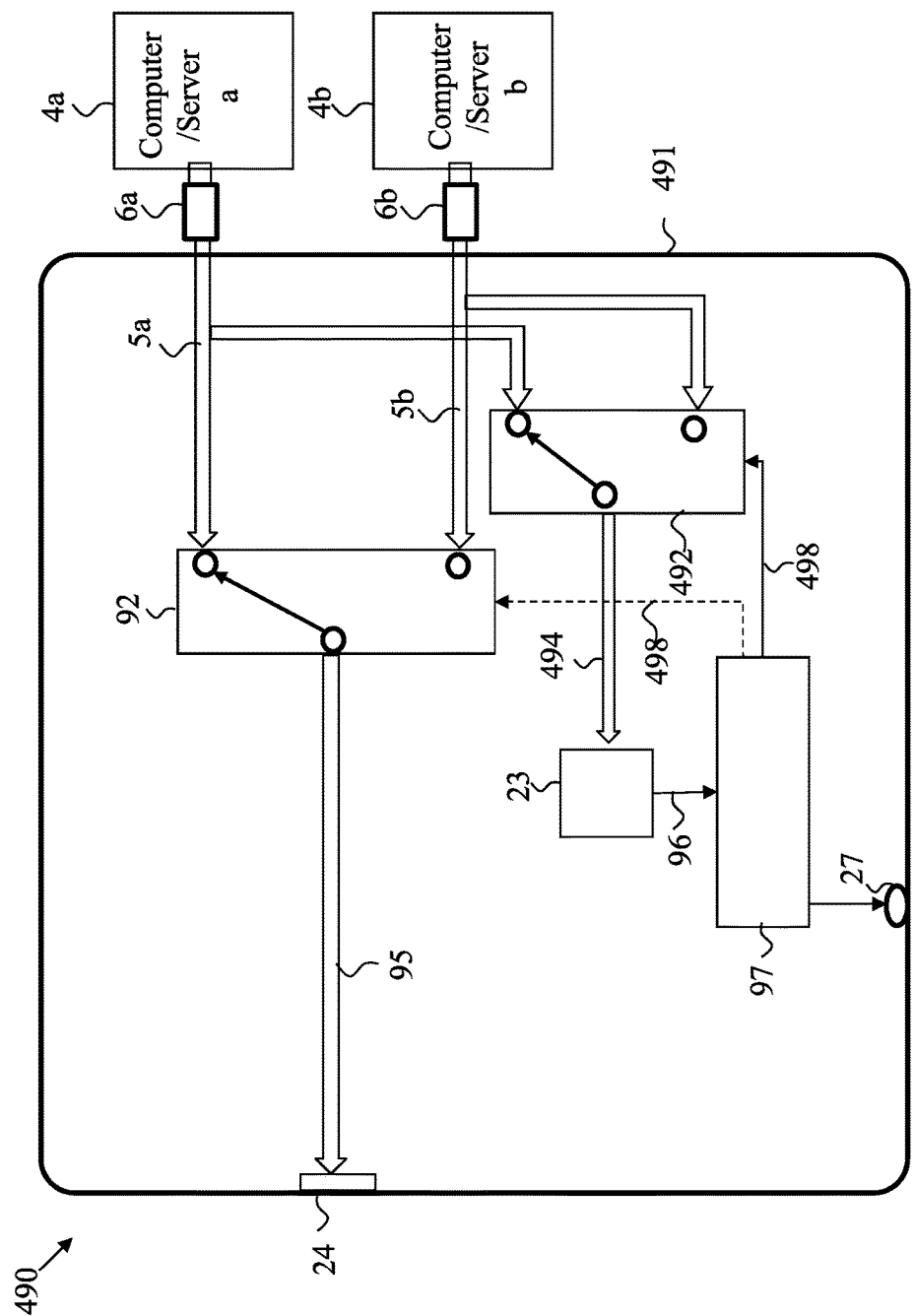

FIG. 4D illustrates a high-level block diagram of a KVM system according to yet another exemplary embodiment of the current invention having two switching video functions.

Figure 5A:
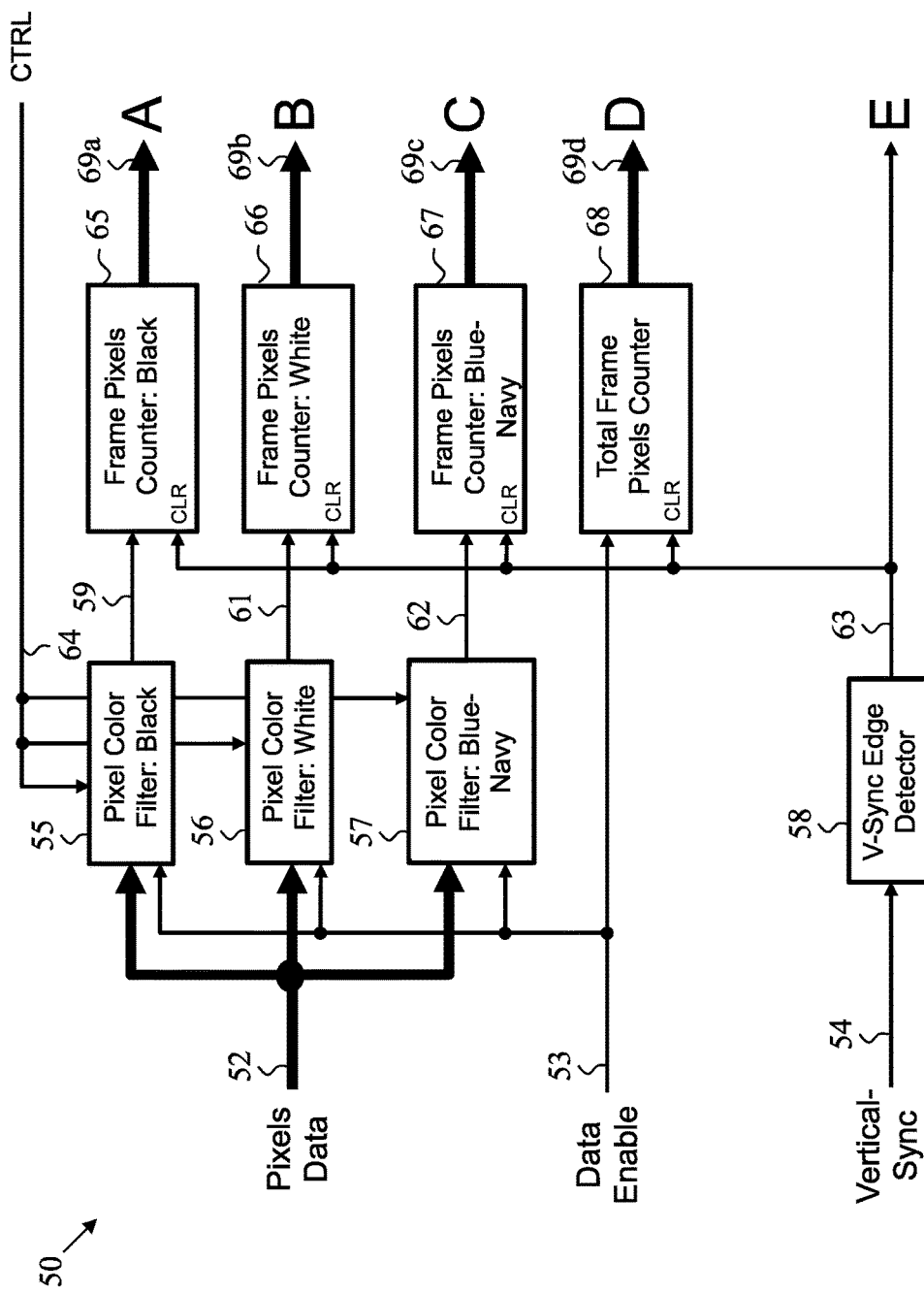

FIG. 5A illustrates a high-level flow-chart of the failure detection algorithm of an exemplary embodiment of the current invention.

Figure 5B:
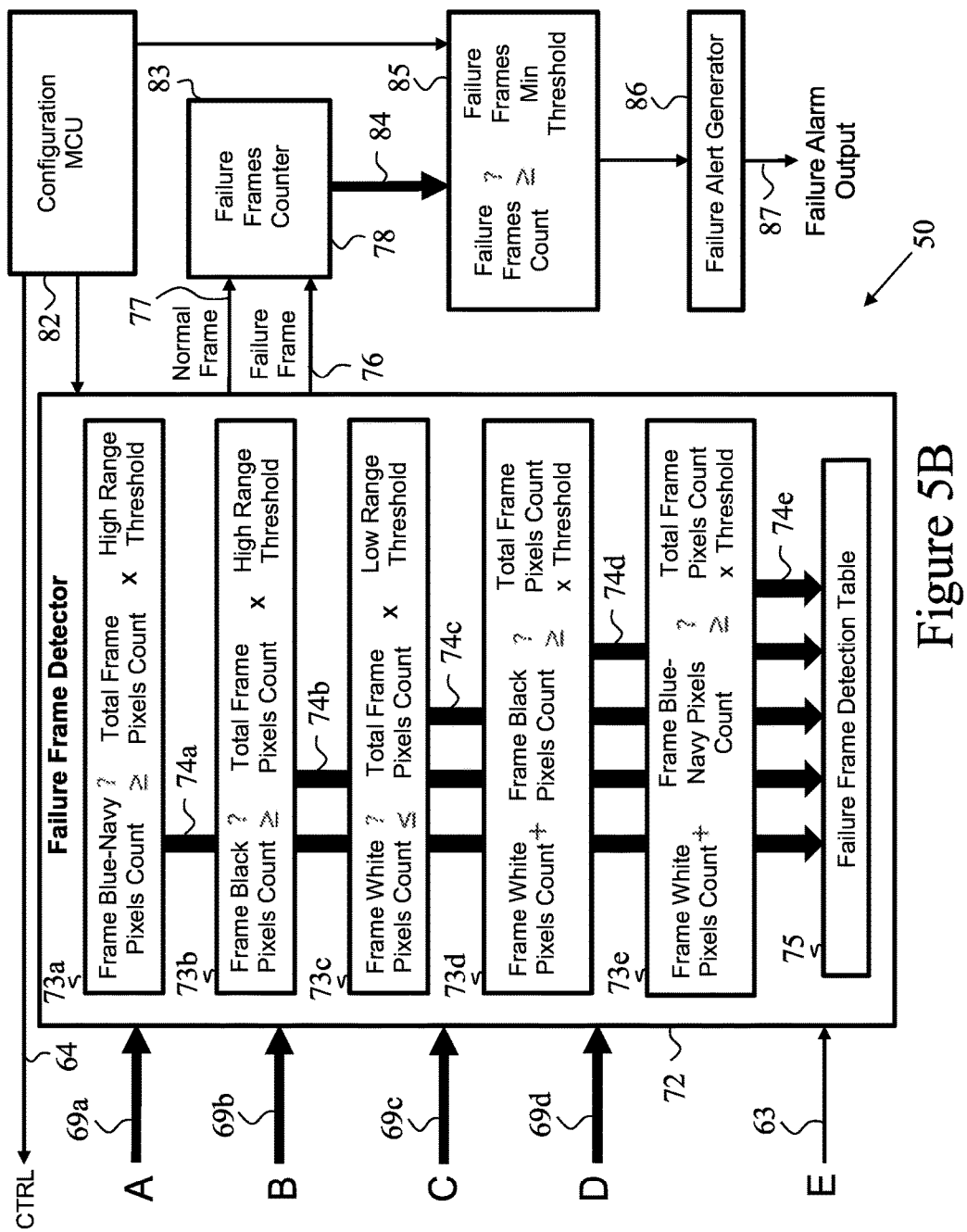

FIG. 5B illustrates a high-level flow-chart of the failure detection algorithm of an exemplary embodiment of the current invention.

DETAILED DESCRIPTION OF THE DRAWINGS

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, or the like) or multiple pieces of hardware. Similarly, the programs may be stand-alone programs, may be incorporated as subroutines in an operating system, may be functions in an installed software package, and the like.

Figure 1A:
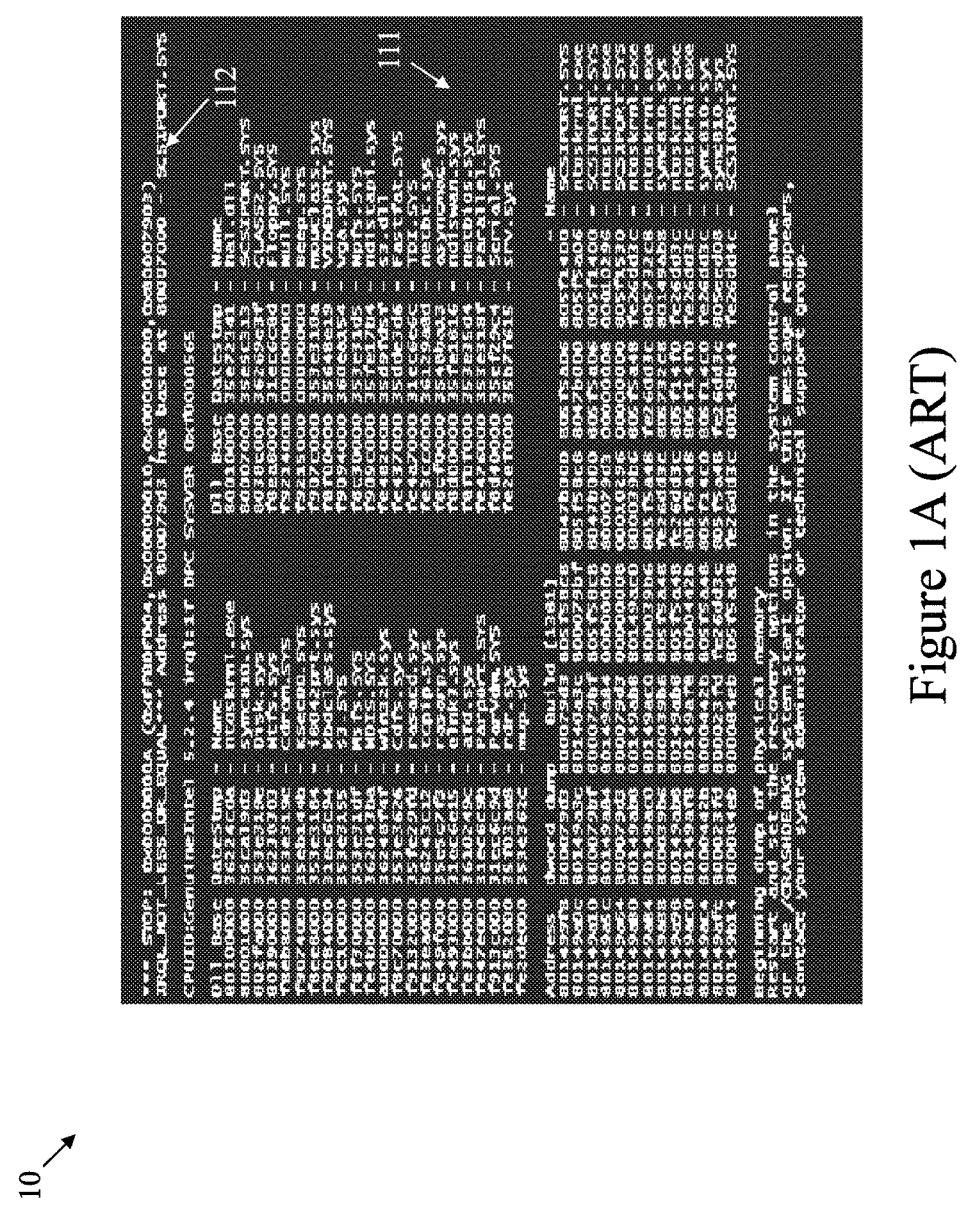

FIG. 1A illustrates an example of Windows Operating System Blue Screen of Death display capture (BSoD) 10.

The BSoD is an error screen displayed on a Windows computer system after a fatal system error, also known as a system crash: when the operating system reaches a condition where it can no longer operate safely.

In this figure the Navy blue colored background 111 (shown in black color) is visible together with the white fonts 112.

Figure 1B:
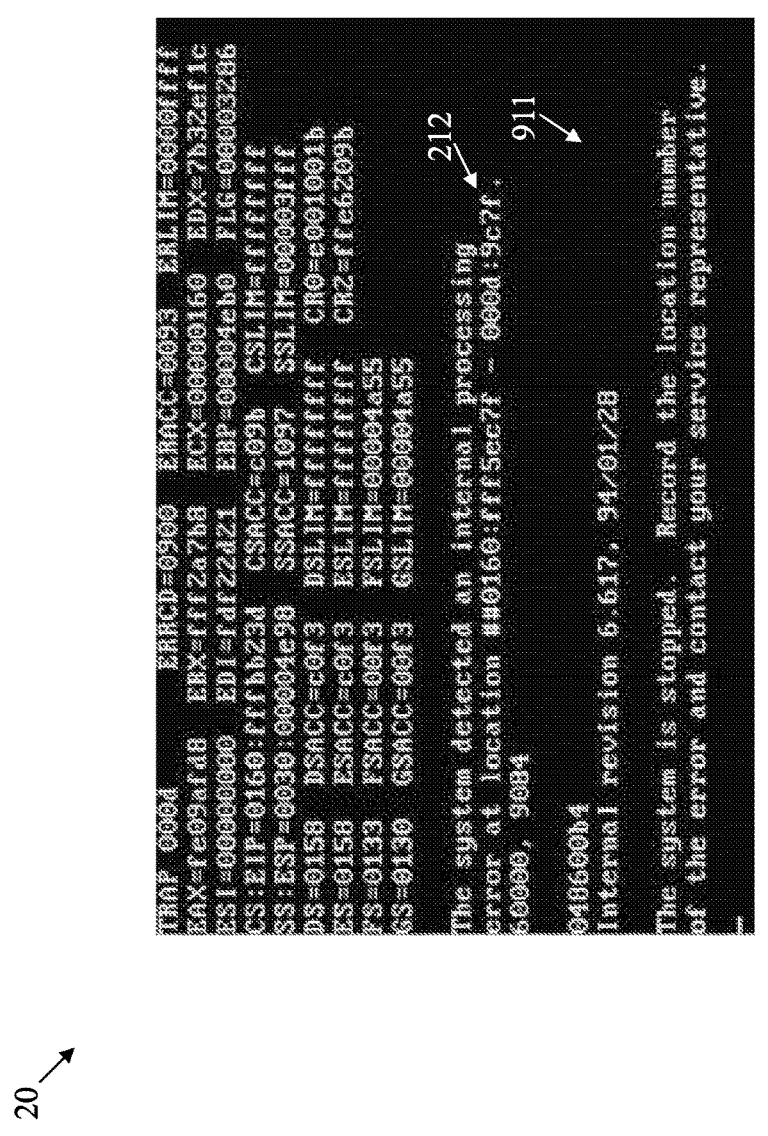

FIG. 1B illustrates an example of Windows Operating System BIOS Black Screen display capture 20.

In this figure the black colored background 911 is visible together with the white fonts 212.

FIGS. 2A-B, schematically show KVM system of the art. To avoid cluttering the drawing only essential elements needed to explain the basic operation of these KVM are depicted here. KVM system of the arts may comprise additional elements and functionalities. Such additional details may be found in the prior art publication provided with this application.

FIG. 2A schematically illustrates a computer system 120 using a KVM switching apparatus 150 of the prior art.

Hosts or computers 4x ("x" herein and throughout the document refers to any of the letters "a", "b" etc. that indicates identical or similar elements in a plurality of elements. Generally, the number of such elements may be different, and often larger than the number of elements seen in the drawings.) are connected to KVM switch 150 via the corresponding video lines 134x and USB channels 135x. User display 104 is connected to KVM switch 150. User human interfaces such as user keyboard 106 and user mouse 105 are connected to KVM switch 150, for example via USB channels 107 and 108 respectively.

USB controller 180 combines the signals from user keyboard 106 and user mouse 105 into combine USB channel 109. Additionally, USB controller 180 extracts from the signals from user keyboard 106 and user mouse 105 host-selection commands such as keyboard combinations or clicking on specific icons for controlling the host selection switches such as video selector switch 165 and host interface selector switch 170 via command line 177.

Video selector switch 165 connects the selected video input from the selected one of the hosts 4x to be displayed on user display 104. Host interface selector switch 170 switches the signals from user keyboard 106 and user mouse 105 to the selected one of the hosts 4x.

It should be noted that since USB communication is generally bidirectional (as pointed out by the dual headed arrows 154x, 109, 107 and 108, isolation of hosts 4x cannot be guaranteed in this prior art non-secure KVM switch. For example, USB controller 180 may be hacked to be used as a spying device for extracting and storing secret information from high-security host 4a which is connected to high-security network 198a when host 4a is selected. Later, when host 4b which is connected to low security or open Internet 198b is selected, the stored secret information may be transferred from the hacked USB controller 180 to host 4b and from there to the adversary's site over the non-secure network 198b. Additionally, a fake or doctored user human interface 105 or 106 may serve for the same purpose. It is easy to modify a keyboard or a mouse to be used, in addition to their normal operation, as mass storage devices for the purpose of data theft.

A less appreciated is the security venerability associated with modern video displays. Generally, display 104 receives video signals via video line 169. However, in order to operate correctly, display data such as Extended Display Identification Data (EDID) is generally and optionally communicated between user display 104 and hosts 2x via bidirectional channel 169 and the corresponding 139x channels. Again, a doctored or hacked display may be used for leaking information among hosts 4x via bidirectional channel 169 and the corresponding 139x channels.

FIG. 2B schematically illustrates a secure computer system 129 using a secure KVM switching apparatus 250 of the prior art.

For brevity, only the modifications from FIG. 2A are discussed herein. It should be noted that a secure KVMs are known in the art and may comprise additional functionalities not discussed herein.

Non-compromised isolation of hosts 4x via the human interface lines is maintained by the following modifications:

USB controller 280, acting as a host emulator in front of user keyboard 106 and user mouse 105, combines the signals from user keyboard 106 and user mouse 105 into combine unidirectional channel 109. Commands unidirectional channel 109 optionally pass through unidirectional data flow enforcement devices 235x to the corresponding USB device emulators 360x which bidirectional communicate with a corresponding hosts 4x. It is clear to see that no data can leak through the human interface channels from one host to the other.

Video data flow enforcement devices 239x inserted in the flow of video signals 134x similarly ensure isolation of hosts 4x with respect to the video channels. EDID (or other display information) is not allowed to be exchanged freely between hosts 4x and user display 104. Instead, display data is exchanged between user display 104 and user display interface unit 210, while each host 4x can exchange display data only with its corresponding display interface units 211x.

Pending applications to the inventor of this invention disclose method of synchronizing data in user display interface unit 210 and data in display interface units 211x. Some embodiments in these application show KVM and secure KVMs having single and multiple user displays and multiple video outputs for each host. It would be easy for a man skilled in the art to extend the current invention to be integrated within KVM having multiple display ports and such KVMs are within the scope of the current invention.

FIG. 3A schematically illustrates a computer system 320 using a KVM switch 350 with a failure screen detector 300 according to an exemplary embodiment of the current invention.

The KVM functionality of the embodiment depicted in FIG. 3A is similar to that depicted in FIG. 2A and thus, only the added elements aimed at detection, reporting and recovering from failure of a host will be discussed. KVM switch 350 comprises a failure screen detector 300 which receives video signals from hosts 4x. As will be discussed later and specifically in FIGS. 5A-B, failure screen detector 300 is capable to detect at least one or several failure screens such as seen in FIGS. 1A and 1B.

In response to detecting a host failure, failure screen detector 300 may activate via command line 178 the video selector switch 165 and the host interface selector switch 170 to select the failed host. The user then becomes aware that the host had failed by seeing the failure screen on display 104 and can take actions to correct the situation using the user human interfaces such as user keyboard 106 and user mouse 105.

Additionally, optionally, or alternatively, in response to detection a host failure, failure screen detector 300 may take automatic corrective action by commanding the USB controller 180 via command line 178, to execute a pre-defined keyboard and or mouse sequence at the failed host 4x, via USB line 135x, USB switch 170 and USB line 109.

Additionally, optionally, or alternatively, in response to detecting a host failure, Failure screen detector 300 may send a message to an external failure management device 350 connected to optional external port 27. This external port 27 may be connected to other management devices to generate system alarms or warnings. For example, but not limited to, serial protocol such as RS-232, USB, or Ethernet may be used.

It should be noted here that in secure computer system, the design of the USB controller 180 shall be made in such way that will assure that failure of one host would not affect or may not be detectable by the other host(s) through changes in timing or USB switching actions. For example, recovery commands initiated by Failure screen detector 300 cause USB controller 180 to generate recovery keyboard (and/or mouse) command only while host interface selector switch 170 is switched to the failed host. Optionally, the recovery process takes a short time duration, or few short time duration intervals, such that the user ability to continue interacting with the non-failed hosts is only slightly affected or not affected at all.

Optionally, Failure screen detector 300 monitors the recovery process of the failed host. This could be done by analysis of the video signals from the failed host and determining successful recovery. It should be noted that in some cases recovering a host may require a sequence of commands, timed in responses to the recovery progress which may progress at different rate depending on the host and the nature of the failure. In this cases, Failure screen detector 300 may be adopted to recognized the known screens generated by a host during its recovery process and respond accordingly. Optionally and additionally, a log or a message may be generated and optionally sent to the Failure Management device 350 with details of the successful recovery. Optionally and additionally the number of recovery attempts may be limited, and log or a message may be generated and optionally sent to the Failure Management device 350 if recovery attempts have not been successful.

FIG. 3B schematically illustrates a computer system using a KVM switch with a fault detection unit according to another exemplary embodiment of the current invention.

The KVM functionality of the embodiment depicted in FIG. 3B is similar to that depicted in FIG. 3A and thus, only the added elements will be discussed.

In order to reduce cabling, signals 109 from user interface devices 105 and 106 are combined with host-recovery signals from the appropriate device emulator 360$x$ in combiner such as USB HUB 361$x$ which is connected to the failed host 4$x$.

Optionally, the user can continue to interact and view any of the host.

Optionally the user can select the failed host. In this case, user commands may take priority over the recovery command that automatically generated by failure screen detector 300. Optionally, the user can halt or cancel the automatic recovery attempts.

It should be noted that device emulators 360$x$ and USB HUBs 361$x$ may also be used to "keep alive" the USB bidirectional connection between the KVM or failure detection device and the non-selected host. Without such devices, any time a host 4$x$ is selected, USB connection has to be established or re-established. This time delay may be annoying when a user is actively interacting with a plurality of hosts 4$x$ and frequently changes the selected host. However, when the KVM or failure detection device is primarily used for monitoring and failure detection and recovery (manual or automatic), such device emulators 360$x$ and USB HUBs 361$x$ may be eliminated for reducing cost and complexity.

FIG. 3C schematically illustrates a secure computer system 329 using a secure KVM switch 352 with a fault detection unit 359 according to an exemplary embodiment of the current invention.

The embodiment depicted in this figure combines the reduce cabling of FIG. 3B with the host isolation and security of FIG. 2B, and thus, only the added or modified elements will be discussed.

In this figure, failure screen detector 359 is seen integrated with device emulators and is capable of transmitting host recovery commands, optionally via unidirectional data flow enforce device 295$x$ to device emulator 360$x$. Device emulator 360$x$ emulates keyboard and/or mouse signals in response to user commands 209 or automatic recovery commands from screen failure detector 359.

It should be noted that screen failure detector 359 may further affect the selection switches 165 and 170 as seen in FIG. 3B. It should be noted that device emulators 360$x$ separated from screen failure detector 359 may be used as seen in FIG. 3B. It should be noted that unidirectional data flow enforce device 295$x$ may be integrated in one of: device emulators 360$x$; screen failure detector 359 and/or device emulators 360$x$.

It should be noted that a dedicated screen failure detector may be connected to each host 4$x$. A drawing showing this embodiment was omitted for its complexity, but can be easily constructed by a man skilled in the art. is not In this case, isolating of hosts is ensure in the failure detection and recovery channels may be maintained without some of the unidirectional data flow enforce devices.

To save cost, a video scanning switch 399 may be used to connect one video signal from one host to the Failure screen detector 359 at a time. Video scanning switch 399 may be controlled by Failure screen detector 359 via command line 398. This arrangement allows scanning the video signals from the plurality of hosts, and recovering any of the hosts regardless of the selection of switches 165 and 170. Thus, user interaction (viewing and commanding) of the hosts 4$x$ is not affected or impeded by the video signal scanning, except when trying to send both user's commands and automatic recovery commands to same failed host. Optionally, user selection of failed host halts the automatic recovery process. It should be noted here that such arrangement may require active video splitters 204$x$ to split the incoming video signals from computers 4$x$ to video switch 399. As two video splitters may add cost to the KVM 352, it is possible to eliminate one video splitter 204$x$ and the video switch 399 by coupling the Failure screen detector 359 to the video switch 165 output through a single splitter. Such arrangement is shown in FIG. 3D below. While such change may not provide a significant cost saving in 2-Port KVM shown here, it may provide much more cost savings in 8, 16 or 32 port KVMs.

FIG. 3D schematically illustrates a secure computer system 389 using a secure KVM switch 381 with a fault detection unit 359 according to another exemplary embodiment of the current invention.

The embodiment depicted in this figure combines the reduce cabling of FIG. 3B with the host isolation and security of FIG. 2B, and thus, only the added or modified elements will be discussed.

To reduce cost and simplify the system, Failure screen detector 359 is connected behind the video switch 165 to get one selected video signal 205. Controller 280 is adopted to perform scanning the video signals from the plurality of hosts 4x. It should be noted that "splitting" off the video signal as shown in FIGS. 3A and 3B generally requires to add an active splitter which adds cost and complexity.

Video signal 205 is switched video from video splitter 204 that was added behind, or integrated as an additional output to the video switch 165 output. Failure screen detector 359 is having a single video input in this case to receive video signal 205. Control of the video switch 165 is done through command line 206 and controller 280. Since controller 280 is also the keyboard and mouse host emulators same command line 206 may be used to insert any sequence of desired response keyboard or mouse commands to device emulators 360x.

While this arrangement saves video splitters and video switch compared to the arrangement shown in FIG. 3C above, it is lacking the option that the user will work on one computer while the Failure screen detector 359 will continue scanning computers at the background. Decoupling of the user operation and the Failure screen detection may be essential in large KVMs to assure that these two functions would not negatively affect one another. Optionally, scanning of video switch 165 may be paused when user input via keyboard 106 or mouse 105 is detected and resumes after a preset time of user's inactivity.

In an exemplary of the embodiment seen in FIG. 3D, the user's display 104 shows only the video signal of the user selected host. During the brief host analysis periods, the video signal from the currently scanned host is sent to the Failure screen detector 359, and the image on user display 104 freezes or get blank, but the video image from the user selected host is not replaced with image from the currently scanned host. Thus, the user is not subject to uncertainty as to the source of the image seen on display 104.

It should be note that the data security is an added feature and is not essential component of the current invention. Currently, secure KVMs are not in general use in datacenters where the invention may be in use.

FIGS. 4A-D illustrate a high-level block diagram of a KVM systems according to an exemplary embodiments of the current invention. In FIGS. 4A-D, more details of the video switching and the failure screen detection are seen and details of the KVM functionalities which are known from previous figures and the prior are were omitted to reduce cluttering of the drawings.

FIG. 4A illustrates a high-level block diagram of a combiner or multi-viewer KVM system 30 according to an exemplary embodiment of the current invention.

The combiner or multi-viewer KVM device 32 of this exemplary embodiment of the current invention is depicted here as having only two channels for supporting two hosts 4a and 4b, but any number of channels may be added to support larger number of computers/servers 4x. Number of channels in a typical KVM is 8, 16 or 32. This combiner or multi-viewer KVM 32 is having multiple DVI/HDMI/VGA or DisplayPort receivers 8x coupled to computer or server 4x through video plug 6x and video cable 5x respectively.

In this discussion, the letter "x" after an element number (e.g. "8x" and "4x" above) indicates any element from a plurality of the similar or identical elements.

Video receiver 8x is used to convert the incoming video to a digital format 9x such as 24 bit per pixel LCD parallel bus to support communications with the video processor (which can be realized in the form of a processor, FPGA or ASIC) 11. Video processor 11 may have multiple video receivers 8x integrated internally.

Video processor 11 may have external frame buffer memory 12 or internal volatile memory function to store incoming and outgoing video frames. Memory function may be integrated inside the video processor component.

Failure screen detection function 23 programmed into the video processor 11 to analyze video statistical features of incoming video signals in order to effectively detect the various failure characteristics of BSoD, BBS, and other failure screens. Failure screen detection function 23 is optionally connected to optional external port 27 for transmitting alert message when failure is detected or suspected. This port may be connected to other management devices to generate system alarms or warnings. For example, but not limited to, serial protocol such as RS-232, USB, or Ethernet may be used.

As a stand-alone host monitoring-only unit, device 32 of this exemplary embodiment of the current invention may substantially comprise the above mentioned components only.

When used within a KVM switch, Video processor 11 may further have firmware functions to support prior-art user functions that support KVM switching activity such as:
 a) Video source switching—for displaying on a user display a selected one of the video signals from the selected one of hosts 4a;
 b) OSD (On Screen Display)—to add text and icons to the displayed image;
 c) PiP (Picture in Picture)—to show multiple images from a plurality of hosts 4x on a single user display (display screen 104, not seen in this figure). PiP function may be used for automatically select a failure screen or video signal from a host suspected to fail in order to alert the user that an unselected host had failed; and
 d) Scaler—to enable video scale up and down as needed to display one or multiple sources on the user display.

Optionally, resulted video output from video processor is coupled through video transmitter 16 to the video output port 24. This port may be connected to an external display such as LCD monitor or built-in LCD tray module (For example, the built-in LCD tray module "Avocent 18.5" Local Rack Access (LRA) Consoles" from Emerson Network Power, with Global Headquarters at 1050 Dearborn Drive P.O. Box 29186 Columbus, Ohio 43229, or similar devices).

FIG. 4B illustrates a high-level block diagram of another combiner or multi-viewer KVM system 40 according to an exemplary embodiment of the current invention similar to the KVM system 30 of FIG. 4A above.

The combiner or multi-viewer KVM device 42 is having same local video display port 24 but further having KVM over IP function 33. The KVM over IP function is coupled to the video processor 11 to receive the resulted video output 41 selected by the administrator. Typically, the administrator is remotely located and controls system 40 using an IP terminal.

KVM over IP function 33 is also coupled through serial line 25 to the Failure screen detection function 23 to receive signals indicative of detection and recognition of the failure conditions in each connected hosts 4x. Once failure condition in one of the connected hosts 4x is detected by the Failure screen detection function 23, it notifies the KVM over IP function 33 to enable remote administrator alerting through means such as:
 a) Email;
 b) System message sent to centralized management system; and
 c) SMS to the administrator mobile phone.

KVM over IP function 33 optionally further stores a log of detected events on non-volatile memory integrated internally or connected externally (not shown in FIG. 4B). KVM over IP function 33 is further coupled to a LAN (Local Area Network) interface 28 to enable the device 42 to communicate with local or remote administrator through a standard web-browser. Not that in this embodiment, external port 27 may optionally be missing.

Optional USB device emulators 13x are coupled through USB cables 7x having USB Type-A plugs 3x to their respective computer/server 4x. These emulators 13x can emulate one or more of the following USB device functions:
 a) USB keyboard;
 b) USB pointing device;
 c) USB audio device;
 d) USB external drive device;
 e) USB Mass storage device; and
 f) USB communication class device.

Device emulators 13x are coupled through bidirectional serial lines 15x to the KVM over IP function 33 to enable remote operation of the selected host 4x.

KVM over IP function 33 may be used to enable remote connection of the same device listed above. For example—keyboard and mouse may be used at the remote administrator station, to communicate with the KVM over IP function 33 through LAN or WAN. This setup allows remote administrator keyboard and mouse commands to be received by the KVM over IP function 33 and then sent to the selected host 4x through serial line 15x, device emulator 13x, USB cable 7x and USB plug 3x. Similarly, a USB mass storage device, or other data storage, may be connected at the remote location and communicate via the same path (over IP) to the selected computer 4x to enable files copy to and from the computer. For example, such data may appear to host 4x as an external drive from which it can be booted or upgrade its software or operation system in order to recover from a failure, or to prevent future failures.

FIG. 4C illustrates a high-level block diagram of yet another KVM system 90 according to an exemplary embodiment of the current invention similar to the KVM system 40 of FIG. 4A above having video switching function 92.

In this embodiment of the current invention, device 91 is not capable of supporting simultaneous display of multiple channels. In this device 91, input video signals from computers 4a and 4b is switched by video multiplexer or switch function 92. This switch is controlled by microcontroller function 97 based on user commands.

In an exemplary embodiment of the invention, when the user is not working with the device 91, the microcontroller 97 initiates automatic scanning of the channels (that is: switch 92 periodically connects to one host 4x at a time). This is done by changing command line 98 at fixed or pseudo-random intervals (for example each 0.5 seconds). Video multiplexer or switch function 92 will then switch between the different computer sources 4a and 4b etc. at time interval. Video output of switch 92 is coupled to video splitter circuitry 93 to enable video output to the user display through lines 95 and console port 24 and at the same time it will feed same video through line 94 to video failure detection block 23. Once video failure detection block identifies a failure, it will trigger signal on line 96 to the microcontroller function 97. Microcontroller function 97 will then initiate an alarm signal through port 27 to other devices or management consoles. Port 27 may be serial port, USB, Ethernet or any other communication protocol.

FIG. 4D illustrates a high-level block diagram of yet another KVM system 490 according to an exemplary embodiment of the current invention similar to the KVM system 90 of FIG. 4B above having two video switching functions 92 and 492.

In this embodiment of the current invention, device 491 is not capable of supporting simultaneous display of multiple channels, but it can consciously monitor al (selected and unselected) hosts 4x. In this device 491, input video signals from computers 4a and 4b is switched by video multiplexer or switch function 92. This switch 92 is controlled by microcontroller function 97 based on user commands.

In an exemplary embodiment of the invention, while the user is working with the device 91, the microcontroller 97 initiates automatic scanning of the channels (that is: switch 492 periodically connects to one host 4x at a time). This is done by changing command line 498 at fixed or pseudo-random intervals (for example each 0.5 seconds). Video multiplexer or switch function 492, which is connected to video outputs 5x of hosts 4x will then switch between the different computer sources 4a and 4b etc. at time interval. Video output of switch 492 will feed its selected video through line 494 to video failure detection block 23. Once video failure detection block identifies a failure, it will trigger signal on line 96 to the microcontroller function 97. Microcontroller function 97 will then initiate an alarm signal through port 27 to other devices or management consoles. Port 27 may be serial port, USB, Ethernet or any other communication protocol.

Additionally and optionally, microcontroller function 97 may force switch 92 to select the failed host, or toggle repeatedly between the user select host and the fail hosts. Optionally, scanning and searching for failed host or plurality of failed hosts while the user switch among hosts, and irrespectively to the user selected host, and while a host or a plurality of host are in failed state.

FIGS. 5A-B illustrate a high-level flow-chart diagram of the detection algorithm used by the video processing function of the exemplary embodiment of the current invention.

It should be noted that blocks in FIGS. 5A-B may be realized in hardware or software or combinations thereof.

FIG. 5A illustrates the frame filtering stage of the detection algorithm used by the video processing function of the exemplary embodiment of the current invention.

The failure detection system 50 is aimed to detect specific failure screens such as BSoD and or BBS from the received video input data pixel 52. Upon positive failure detection it produces an alarm or raising an indication output signal.

Note that the detection system 50 shown in FIGS. 5A and 5B is targeted to handle a single received video input channel. To support multiple computers/servers (in KVM for example) the following changes may be implemented:
 a) Multiple instances of this system may be implemented to enable simultaneous detection of multiple sources (see FIG. 4 above); or
 b) Video switching circuitry may be added before the detection logic so that it will switch between the multiple channels on a timely basis (for example each 0.5 seconds, see FIG. 4B above).

The video input signals into the failure detection sub-system contain the following standard digital video components:
 Video pixels data 52
 DE (Data Enable) signal 53
 V-Sync (Vertical synchronization) signal 64

For detecting a failure screen the received active video pixels (received only during the DE 53 active period) are analyzed on the first stage, which involves Pixel Color Filters 55, 56 and 57.

Each such a Pixel Color Filter is pre-configured to pass only pixels which are belong to a predefined color range. For this purpose, three Pixel Color Filters are involved, for analyzing pixels in the color ranges: Black 55, White 56 and Blue-Navy 57. The predefined values for the color range for each Pixel Color Filter can be configured individually from the controlling microcontroller (MCU) 82.

Each filter (55, 56, 57) acts on the all the pixel in the frame 52 and set the pixel value to "1" if the pixel color is within the range specified to the filter and "0" if the pixel color is outside the range specified to the filter in the corresponding filtered frame output (59, 61, 62).

An indication signal generated as an output (59, 61 and 62) from each Pixel Color Filter (55, 56 and 57 respectively) is sensed on the second stage by successive Frame Pixels Counters (65, 66 and 67 respectively). Each dedicated Frame Pixels Counter counts the overall number of pixels in a specific color range during a complete frame.

In addition to the Frame Pixels Counters which count only the pixels belong to a specific color range as indicated from the Pixel Color Filter, the total number of pixels in a frame are counted by the Total Frame Pixels Counter 68.

The V-Sync input signal 54 is analyzed by the V-Sync Edge Detector module which is sensitive to the rising edge of the vertical synchronization signal. In this case a new frame indication signal is generated. Alternatively the V-Sync Edge Detector 58 can be implemented with a sensitive to the falling edge of the V-Sync instead of the rising edge.

The new frame indication signal is used by the Frame Pixels Counters (65, 66 and 67) and by the Total Frame Pixels Counter 58 for clearing and initializing the pixels counts to be prepared for counting the successive incoming frame through clear signal 63. Frame pixel counters 65, 66, 67 and 68 outputs are 69*a*, 69*b*, 69*c* and 69*d* respectively.

The abovementioned filtering technique is but an example for pixel color analysis. Other alternative method may be used. For example, pixel's color value may be sequentially analyzed one after the other:
a) Total pixel counter 68 will be incremented for each analyzed pixel;
b) Black pixel counter 65 will be incremented if the color value of the analyzed pixel is in the predefined black color range;
c) White pixel counter 66 will be incremented if the color value of the analyzed pixel is in the predefined white color range; and
d) Blue pixel counter 67 will be incremented if the color value of the analyzed pixel is in the predefined blue color range.

FIG. 5B illustrates the fault determination stage of the detection algorithm used by the video processing function of the exemplary embodiment of the current invention.

As soon as a complete frame is analyzed all the produced counts are used for calculating the failure detection by the Failure Frame Detector module 72. In this module 72 the counts of the selected colors (Black 65=A, White 66=B and Blue-Navy 67=C) and the total numbers of frame pixels (Total 69=D) are examined in order to fill the following conditions in order to detect failure screen:

Is the number of the Blue-Navy pixels in a frame is high enough to go over a high threshold calculated from the total number of pixel in a frame (73*a*)? Output of this block is 74*a*.

Is the number of the Black pixels in a frame is high enough to go over a high threshold calculated from the total number of pixel in a frame (73*b*)? Output of this block is 74*b*.

Is the number of the White pixels in a frame is low enough to go under a low threshold calculated from the total number of pixel in a frame (73*c*)? Output of this block is 74*c*.

Is the number of the Black pixels plus the number of the White pixels is high enough to be above a high threshold calculated from the total number of pixel in a frame (73*d*)? This indication is used to conclude that there are no, or only few other received color other than the Black and White colors. Output of this block is 74*d*.

Is the number of the Blue-Navy pixels plus the number of the White pixels is high enough to be above a high threshold calculated from the total number of pixel in a frame (73*e*)? This indication is used to conclude that there are no other received color other than the Blue-Navy and White colors. Output of this block is 74*e*.

The calculated high and low thresholds are calculated as predefined percentages of the frame total pixels count 69*d*. The predefined values for each threshold can be configured individually from the controlling MCU 82.

A logic block named Failure Frame Detection Table 75 detects for fulfillment of some of the conditions in order to conclude if the received frame is either a failure frame (and identify its exact type) or a normal (not a failure) frame.

The Failure Frames Counter 83 counts for consistent detected failed frames 76 and initialize the count when a normal frame is detected. In this manner only a successive input of failure frames are used to detect a stable failure state. The count output 84 generated by the Failure Frames Counter 83 is examined by the comparator 85 which compares the number of the successive failure frames and initiates a fault alert when successive failure frames is over a minimum threshold, indicating on a stable failure state. The predefined value for the threshold can be configured from the controlling MCU 82.

The indication on a stable failure state is sensed by a Failure Alert Generator module 86 which produce an alarm and/or raises an indication signal on the detection of the failure state through output line 87. On a specific implementation case this module can be implemented as a simple pass-through of the previous comparator result.

The configuration MCU 82 block included in the detection diagram is not restricted to be a dedicated MCU integrated in each failure detection for each separate video input channel.

This MCU function may be combined with the controller function 97 shown in FIG. 4B above.

The output of the failure detection diagram 87 is an alarm indication or another indication which is used to trigger a successive alarm/message report function, which is outside the scope of the described system diagram.

Optionally, a frame stability is also analyzed. For example, each pixel color value in a currently analyzed frame is subtracted from the color value of the corresponding pixel in the previously analyzed frame. After the subtraction, the number of pixels with subtracted value not equal zero (changed pixels) is determined. If the number of changed pixels is above a preset percentage of the total pixels in the frame, the image is not static.

Optionally, testing for static image is performed only if a plurality of faulty frames were detected. Alternatively, pixel color analysis image is performed only if a plurality of static frames were detected.

Optionally a template failed screen or plurality of template failed screens are saved and are compared to the frame from a host to determine if the host is displaying one of the failed screen templates. Such comparison may be done by subtracting the template from the host frame and determining the percentage of non-zero pixels.

Optionally a template of legitimate screen or plurality of legitimate templates screens, which are similar to failed screens but indicative of normal operation of a host are saved and are compared to the frame from a host to determine if the host is working properly while displaying screen similar to a failed screen. Such comparison may be done by subtracting the template from the host frame and determining the percentage of non-zero pixels.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A Keyboard Video Mouse (KVM) device for monitoring and operating plurality of coupled computers or servers comprising:
   a plurality of computer interfaces, each capable of receiving video signal from a corresponding host computer or server;
   a plurality of video receivers, each coupled to the corresponding one of said 10 computer interfaces;
   a video processor, capable of receiving at least one video signal and transmit at least one video output to at least one locally connected display,
   wherein said video processor has a video analysis function, to detect a failure of a host or server based on analysis of said at least one video signal by video recognition of pre-defined failure screens selectable from the list of: Blue Screen of Death, Black Screen of Death, and at least one other predefined failure screen, captured by the manufacturer or by an administrator;
   wherein said video recognition comprises at least:
   capturing a video frame from said video signal:
   identifying and counting pixels in a first color range in said video frame;
   identifying and counting pixels in a second color range in said video frame;
   counting the total number of pixels in said video frame;
   comparing the number of pixels in said first color range to said total number of pixel in said video frame;
   comparing the number of pixels in said second color range to said total number of pixel in said video frame; and
   determining if the host computer that generated said video frame has failed, based on said comparing the number of pixels in said first color range to said total number of pixel in said video frame and said comparing the number of pixels in said second color range to said total number of pixel in said video frame, wherein a failure is detected when at least the number of pixels in said first color range and the number of pixels in said second color range are not within a predefined threshold calculated to said total number of pixels in said video frame; and
   a video scanning switch to automatically connect one of said plurality of computer interfaces at a time to said video processor.

2. The KVM device of claim 1, further comprising a warning function, capable of warning a system administrator through at least one of: email; system message sent to centralized management system; and SMS to the administrator mobile phone.

3. The KVM device of claim 2, wherein said warning the administrator is based on a table that predefines the assigned at least one administrator to each coupled host computer or server.

4. The KVM device of claim 2, wherein said warning email includes video capture.

5. The KVM device of claim 1, further configured to provide automatic remedy for the detected failure.

6. The KVM device of claim 5, wherein said automatic remedy for the detected failure comprises: upon detection of the Blue Screen of Death, transmitting to the failed host computer or server emulated keyboard sequence comprising CTRL+ALT+DEL.

7. The KVM device of claim 1, wherein said video processor is further coupled to a video transmitter to convert video format received from said video processor into a standard video display protocol to drive an external display.

8. The KVM device of claim 1 wherein at least one of said computer interfaces further comprises a USB device emulator to enable emulation of USB devices selectable from the list of:
USB keyboard;
USB pointing device;
USB audio device;
USB floppy drive device;
USB Mass storage device; and
USB communication class device.

9. The KVM device of claim 1, further comprising a KVM over IP function to compress and send video output from said video processor to a remote administrator over IP.

10. The KVM device of claim 1, further comprising a Scaler function to scale video information to the format used by the connected display.

11. The KVM device of claim 1, wherein said video processor further comprising PiP functionality.

12. The KVM device of claim 1, further comprising an audible warning device for alerting when a host failure was detected.

13. The KVM device of claim 1 and capable of generating and maintaining Log detailing failure events.

14. The KVM device of claim 2, wherein said warning email includes log and history of the failed server.

15. The KVM device of claim 1, wherein the behavior of the KVM device does not change once a failure is detected in a way that may be detectable to the other, non-failed, computers hosts or servers.

16. The KVM device of claim 1, wherein said video scanning switch is independent from switches used to switch the keyboard video and mouse of the KVM device.

17. A method for detecting failure of a host computer or a server comprising:
connecting to a plurality of video outputs of each of a plurality of monitored host computers or servers;
receiving a plurality of video signals, each from a host computer or a server of the plurality of monitored host computers or servers;
automatically selecting at least one video frame from one host computer or a server at a time;
identifying and counting pixels in a first color range in said video frame;
identifying and counting pixels in a second color range in said video frame;
counting the total number of pixels in said video frame;
comparing the number of pixels in said first color range to said total number of pixel in said video frame;
comparing the number of pixels in said second color range to said total number of pixel in said video frame; and
determining if the host computer that generated said video frame has failed, based on said comparing the number of pixels in said first color range to said total number of pixel in said video frame and said comparing the number of pixels in said second color range to said total number of pixel in said video frame, wherein:
a failure is detected when at least the number of pixels in said first color range and the number of pixels in said second color range are not within a predefined threshold calculated to said total number of pixels in said video frame; and
the determining recognizes said video frame to be a display of a pre-defined screen selectable from the list of: Blue Screen of Death, Black Screen of Death, and at least one other predefined failure screen, captured by the manufacturer or by an administrator.

18. The method of claim 17, further comprising field updating at least one parameter used in said comparing the number of pixels in said first color range to said total number of pixel in said video frame or in said comparing the number of pixels in said second color range to said total number of pixel in said video frame in order to detect a failure of a host computer or a server.

19. The method of claim 18, wherein said field updating of said at least one parameter to the failure of a host computer or a server enables detection of new types of failure screens.

20. The method of claim 18, wherein said field updating of said at least one parameter to the failure of a host computer or a server enables to skip and avoid false detection of non-failure screens.

* * * * *